US010162548B2

(12) United States Patent
Robins et al.

(10) Patent No.: US 10,162,548 B2
(45) Date of Patent: Dec. 25, 2018

(54) ALLOCATING RAID STORAGE VOLUMES ACROSS A DISTRIBUTED NETWORK OF STORAGE ELEMENTS

(71) Applicant: EMC IP Holding Company LLC, Hopkington, MA (US)

(72) Inventors: Edward S. Robins, Winchester, MA (US); Kevin Granlund, Sutton, MA (US); Seema Pai, Shrewsbury, MA (US); Evgeny Malkevich, Newton, MA (US); Stephen Richard Ives, West Boylston, MA (US); Roii Raz, Providence, RI (US); Barak Bejerano, Natick, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/468,516

(22) Filed: Mar. 24, 2017

(65) Prior Publication Data
US 2017/0199695 A1  Jul. 13, 2017

Related U.S. Application Data

(63) Continuation of application No. 14/231,282, filed on Mar. 31, 2014, now Pat. No. 9,641,615.

(51) Int. Cl.
G06F 11/00 (2006.01)
G06F 3/06 (2006.01)
(Continued)

(52) U.S. Cl.
CPC .......... *G06F 3/0631* (2013.01); *G06F 3/0604* (2013.01); *G06F 3/067* (2013.01);
(Continued)

(58) Field of Classification Search
CPC .. G06F 11/1076; G06F 3/0631; G06F 3/0689; G06F 11/1088; G06F 11/2069
See application file for complete search history.

(56) References Cited

U.S. PATENT DOCUMENTS 7,340,640 B1 *  3/2008  Karr ...................... G06F 3/0613
                                                     711/209
8,386,838 B1 *  2/2013  Byan ................... G06F 11/1484
                                                     714/5.11
(Continued)

Primary Examiner — Charles Ehne
(74) Attorney, Agent, or Firm — Anderson Gorecki LLP

(57) ABSTRACT

A distributed network of storage elements (DNSE) is provided in which the physical capacity of each drive is split into a set of equal sized logical splits which are individually protected within the DNSE using separate RAID groups. To reduce restoration latency, members of the RAID groups having a member in common on a given drive are spread within the DNSE to minimize the number of sets of drives within the DNSE that have RAID members in common. By causing the splits to be protected by RAID groups, restoration of the splits may occur in parallel involving multiple drives within the DNSE. By minimizing the overlap between RAID members on various drives, failure of a given drive will not require multiple reads from another drive in the DNSE. Likewise, spare splits are distributed to enable write recovery to be performed in parallel on multiple drives within the DNSE.

18 Claims, 26 Drawing Sheets

(51) Int. Cl.
*H04L 29/08* (2006.01)
*G06F 11/10* (2006.01)
*G06F 11/20* (2006.01)

(52) U.S. Cl.
CPC .......... *G06F 3/0619* (2013.01); *G06F 3/0644* (2013.01); *G06F 11/1088* (2013.01); *H04L 67/1097* (2013.01); *G06F 11/1076* (2013.01); *G06F 11/1092* (2013.01); *G06F 11/2094* (2013.01)

(56) References Cited

U.S. PATENT DOCUMENTS 9,430,342 B1 * 8/2016 Byan .................... G06F 9/45533
2008/0155223 A1 * 6/2008 Hiltgen ............... G06F 9/45558
711/173

* cited by examiner

FIG. 3

| Drive 1 | |
|---|---|
| 1 | 66A |
| 2 | 15A |
| 3 | 17A |
| 4 | 11A |

| Drive 2 | |
|---|---|
| 1 | 15A |
| 2 | |
| 3 | |
| 4 | |

| Drive 3 | |
|---|---|
| 1 | |
| 2 | 15A |
| 3 | |
| 4 | |

| Drive 4 | |
|---|---|
| 1 | |
| 2 | 17A |
| 3 | |
| 4 | |

| Drive 5 | |
|---|---|
| 1 | |
| 2 | |
| 3 | 17A |
| 4 | |

| Drive 6 | |
|---|---|
| 1 | |
| 2 | |
| 3 | |
| 4 | 11A |

| Drive 7 | |
|---|---|
| 1 | 66A |
| 2 | |
| 3 | |
| 4 | |

| Drive 8 | |
|---|---|
| 1 | |
| 2 | |
| 3 | 66A |
| 4 | |

| Drive 9 | |
|---|---|
| 1 | |
| 2 | |
| 3 | 17A |
| 4 | |

| Drive 10 | |
|---|---|
| 1 | |
| 2 | |
| 3 | 15A |
| 4 | |

| Drive 11 | |
|---|---|
| 1 | |
| 2 | |
| 3 | |
| 4 | 66A |

| Drive 12 | |
|---|---|
| 1 | |
| 2 | 11A |
| 3 | |
| 4 | |

| Drive 13 | |
|---|---|
| 1 | 11A |
| 2 | |
| 3 | |
| 4 | |

16 → (points to Drive 11, row 1)

FIG. 5

Hardware Fault Zone 1

| 1 | 2 | 3 | 4 | 5 | 6 | 7 | 8 | 9 |
|---|---|---|---|---|---|---|---|---|
| 66 |  | 10 | 11 | 12 | 13 | 14 |  | 4 |
| 2 | 82 | 17 | 18 | 19 | 20 | 21 | 22 | 15 |
| 3 | 23 |  | 25 | 26 | 27 | 28 | 29 | 9 |
|  | 30 | 31 |  | 33 | 34 | 35 | 36 | 24 |
| 5 | 37 | 38 | 39 |  | 41 | 42 | 43 | 32 |
| 6 | 44 | 45 | 46 | 47 | 48 | 49 | 50 | 40 |
| 7 | 51 | 52 | 53 | 54 |  | 56 | 57 | 55 |
| 8 | 58 | 59 | 60 | 61 | 62 | 63 | 64 |  |

Hardware Fault Zone 2

| 10 | 11 | 12 | 13 | 14 | 15 | 16 | 17 |
|----|----|----|----|----|----|----|----|
| 66 | 2 | 3 | 4 | 5 | 6 | 7 | 8 |
| 9 | 18 | 19 | 20 | 21 | 22 | 82 | 17 |
| 10 | 26 | 27 | 28 | 29 | 23 | 24 | 25 |
| 11 | 34 | 35 | 36 | 30 | 31 | 32 | 33 |
| 12 | 42 | 43 | 37 | 38 | 39 | 40 | 41 |
| 13 | 50 | 44 | 45 | 46 | 47 | 48 | 49 |
| 14 | 51 | 52 | 53 | 54 | 55 | 56 | 57 |
| 15 | 59 | 60 | 61 | 62 | 63 | 64 | 58 |

Hardware Fault Zone 3

| 19 | 20 | 21 | 22 | 23 | 24 | 25 | 26 |
|----|----|----|----|----|----|----|----|
| 66 | 2 | 3 | 4 | 5 | 6 | 7 | 8 |
| 82 | 11 | 12 | 13 | 14 | 15 | 9 | 10 |
| 17 | 27 | 28 | 29 | 23 | 24 | 25 | 26 |
| 18 | 36 | 30 | 31 | 32 | 33 | 34 | 35 |
| 19 | 38 | 39 | 40 | 41 | 42 | 43 | 37 |
| 20 | 47 | 48 | 49 | 50 | 44 | 45 | 46 |
| 21 | 56 | 57 | 51 | 52 | 53 | 54 | 55 |
| 22 | 58 | 59 | 60 | 61 | 62 | 63 | 64 |

Hardware Fault Zone 4

| 27 | 28 | 29 | 30 | 31 | 32 | 33 | 34 |
|----|----|----|----|----|----|----|----|
| 66 | 2 | 3 | 4 | 5 | 6 | 7 | 8 |
| 23 | 9 | 10 | 13 | 14 | 15 | 11 | 12 |
| 24 | 19 | 20 | 82 | 17 | 18 | 21 | 22 |
| 25 | 36 | 30 | 33 | 34 | 35 | 31 | 32 |
| 26 | 39 | 40 | 43 | 37 | 38 | 41 | 42 |
| 27 | 49 | 50 | 46 | 47 | 48 | 44 | 45 |
| 28 | 52 | 53 | 56 | 67 | 51 | 54 | 55 |
| 29 | 62 | 63 | 59 | 60 | 61 | 64 | 58 |

FIG. 10

$$F = \begin{pmatrix} 4 & 5 \\ 6 & 7 \\ 8 & 9 \end{pmatrix}$$

$$F(1) = \begin{pmatrix} 4 & 5 \\ 6 & 7 \\ 8 & 9 \end{pmatrix}$$

$$F(1) = \begin{pmatrix} 4 & 5 \\ 6 & 7 \\ 8 & 9 \end{pmatrix}$$

$$F = \begin{pmatrix} 4 & 5 \\ 6 & 7 \\ 8 & 9 \end{pmatrix}$$

$$F(1) = \begin{pmatrix} 4 & 5 \\ 6 & 7 \\ 8 & 9 \end{pmatrix}$$

$$F(1) = \begin{pmatrix} 4 & 5 \\ 6 & 7 \\ 8 & 9 \end{pmatrix}$$

$$F = \begin{pmatrix} 4 & 5 \\ 6 & 7 \\ 8 & 9 \end{pmatrix}$$

$$F(1) = \begin{pmatrix} 4 & 5 \\ 6 & 7 \\ 8 & 9 \end{pmatrix}$$

$$F(1) = \begin{pmatrix} 4 & 5 \\ 6 & 7 \\ 8 & 9 \end{pmatrix}$$

(a)  (b)  (c)

Generated Column Vectors (d)

$$C_{11} = \left\{ \begin{pmatrix} 4 \\ 9 \end{pmatrix} \begin{pmatrix} 6 \\ 5 \end{pmatrix} \begin{pmatrix} 8 \\ 7 \end{pmatrix} \right\}$$

$$C_{12} = \left\{ \begin{pmatrix} 4 \\ 7 \end{pmatrix} \begin{pmatrix} 6 \\ 9 \end{pmatrix} \begin{pmatrix} 8 \\ 5 \end{pmatrix} \right\}$$

FIG. 14
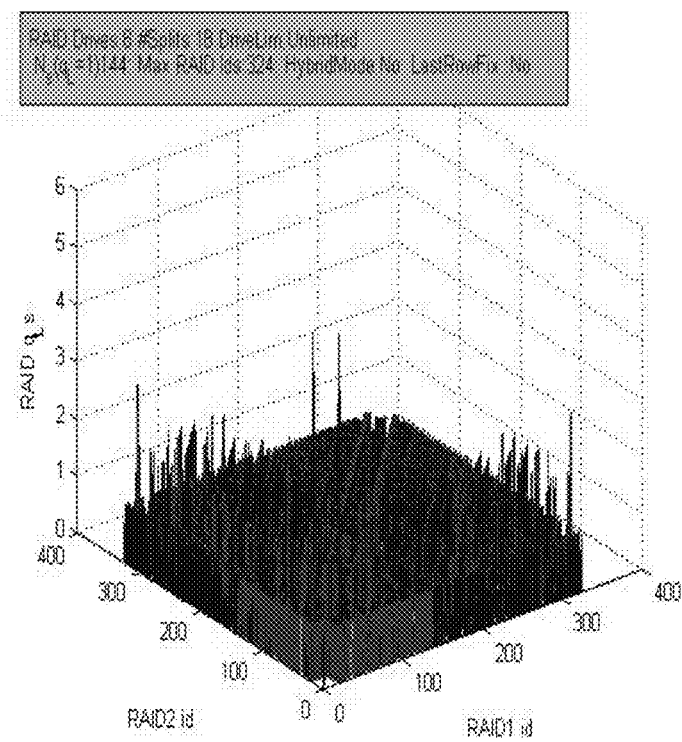
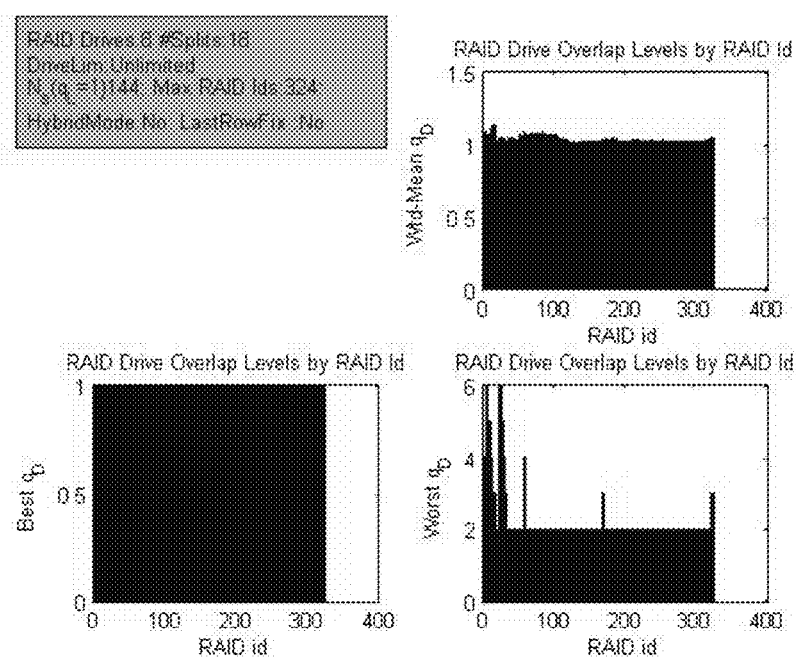

FIG. 20

| Mode | Pick | Distr/... | Spec | Descr |
|---|---|---|---|---|
| Default | ✓ | 100% | Defau | Default-Reassign Splits ... |
| Leave Empty | ☐ | 0% | Defau | Split left empty for Build ... |
| Leave Unassigned | ☐ | 0% | Defau | Split Status can be chan... |
| Turn Into Spares | ☐ | 0% | Defau | Add to the Split Spares |
| Split Size Fixed | ☐ | 0% | 50G | Fix Splits to this size |
| Splits vary by Drive | ☐ | NA | true | Vary Splits per Drive type |
| Virtual short stroking | ☐ | NA | true | Optimize for TDAT IOPS |
| Fix to RAID type | ☐ | NA | ANY | Fix to this RAID only |
| Force to qL Limit | ☐ | 2 | NA | Not to exceed this collisi... |
| Minimize Mean q_L | ☐ | 2.0 | NA | Minimize Mean qL |
| Minimize Upgrade Impa... | ☐ | NA | NA | Minimize data movement ... |
| Ignore Upgrade Impact | ☐ | NA | NA | Optimize without consid... |

Back-Off-Build-Up Algorithm

Example of Utility

- $q_i$ has acceptable range [1,2...5]
- It's utility value declines as it increases:

- If >5, declare unacceptable, but could allow rule to 'soften' on subsequent attempts (change curve)

| Zone # | 1 | 2 | 3 | 4 | 5 | 6 |
|---|---|---|---|---|---|---|
| QTY= | 5 | 7 | 8 | 16 | 12 | 4 |
| Partn→ #1 | 0 | 4 | 4 | 4 | 4 | 0 |
| #2 | 4 | 0 | 4 | 4 | 4 | 0 |
| #3 | 0 | 3 | 0 | 3 | 3 | 3 |
| #4 | 1 | 0 | 0 | 1 | 1 | 1 |
| Fault Zone Cnt: | 5 | 7 | 8 | 12 | 12 | 4 |
| Not used = | 0 | 0 | 0 | 4 | 0 | 0 |

Ex.2

RAID 1

| Zone # | 1 | 2 | 3 |
|---|---|---|---|
| QTY = | 6 | 6 | 6 |
| Partn → #1= | 3 | 3 | 0 |
| #2= | 3 | 0 | 3 |
| #3= | 0 | 3 | 3 |
| Fault Zone Cnt = | 6 | 6 | 6 |
| Not used = | 0 | 0 | 0 |

FIG. 25

| AONT-RS Parameter | Value | Notes |
|---|---|---|
| Data Block size | 4096 | D |
| Gaulois Field Data Value | 12 | $G_D = \log_2(D)$ |
| Gaulois Field Word Length Value | 4 | $G_W < G_D$ |
| Word Length (bytes) | 16 | $W_L = 2^{G_W}$ |
| Number of Words of Data for Word Length | 256 | $= D/W_L$ |
| Canary Word Length | 16 | $= W_L$ |
| Total Data Length | 4112 | $= D + W_L$ |
| Random Key Length | 16 | $W_K = W_L$ |
| Net Data including key | 4128 | $DD = D + W_L + W_K = D + 2W_L$ |
| # Dispersal nodes k | 10 | =k, number of nodes over which data is dispersed & recovery possible |
| Number of bytes/k | 412.8 | $D'(K,C) = D(K,C)/k$ (not rounded) |
| Make equal number of bytes /k | 413 | $D''(K,C) = \text{ROUNDUP}(D'(K,C)/k)$ |
| Net Data to Store | 4130 | $D' = k * D''(K,C)$ |
| Added Bytes | 34 | $\Delta D = D - D'$ |
| Drive Level Redundancy | 2 | r |
| Ri (split drive fault span) * =m>k = k+r | 12 | $Ri = r+k$; |
| Net Data Stored | 4956 | $DS = Ri * D'$ |
| Storage Efficiency | 83% | $n = D/DS$ |

*Cloud R may be composed if $R_{cloud} < Ri$ or decomposed if $R_{cloud} > Ri$, or Cloud distribution set for $R_{cloud} = Ri = 12$ or Ri fixed to = R – see explanation in fig. 7-24b

ALLOCATING RAID STORAGE VOLUMES ACROSS A DISTRIBUTED NETWORK OF STORAGE ELEMENTS

CROSS-REFERENCE TO RELATED APPLICATIONS

This application is a Continuation of U.S. patent application Ser. No. 14/231,282, filed Mar. 31, 2014, the content of which is hereby incorporated herein by reference.

BACKGROUND

This disclosure relates to storage systems and, more particularly, to a method and system for allocating Redundant Array of Independent Disk (RAID) storage volumes across a distributed network of storage elements.

SUMMARY

All examples and features mentioned below can be combined in any technically possible way.

In one aspect, a method for allocating RAID storage volumes across a distributed network of storage elements includes defining at least two logical splits on each of the storage elements, providing RAID protection for the splits of the storage elements, and distributing the RAID protection within the distributed network of storage elements to minimize overlap between RAID Groups on at least two storage elements.

In some implementations different RAID protection schemes are used to provide RAID protection for different splits of a given storage element.

In certain implementations the logical splits comprising a subset of the total storage volume of each of the storage elements.

In some implementations the logical splits are of uniform size within each storage element of the distributed network of storage elements.

In certain implementations the RAID protection is provided by RAID groups, each RAID group providing RAID protection for at least one of the splits of a given storage element.

In some implementations a separate RAID group may be used to provide protection for each of the splits of the given storage element.

In certain implementations the step of distributing the RAID protection within the distributed network of storage element causes members of each of the separate RAID groups to be stored on sets of distinct storage elements within the distributed network of storage element.

In some implementations the step of distributing the RAID protection within the distributed network of storage elements is implemented using a set of heuristics defining placement rules for members of the RAIDs.

In certain implementations the heuristics comprise hard rules and soft rules.

In some implementations the hard rules include a first hard rule prohibiting placement of two RAID members on a given storage element and a second hard rule requiring placement of RAID members in separate hardware protection zones within the distributed network of storage elements.

In certain implementations the hardware protection zones comprise subsets of storage elements physically separated and supported by independent power supplies and network infrastructure. In some implementations the protection zones comprise subsets divided into logical subsets to support logic redundancy such as controllers.

In some implementations the soft rules comprise a first soft rule seeking to minimize overlap between common sets of RAID members on subsets of storage elements. The soft rules may be degraded or relaxed in order to organize RAID Groups efficiently to meet hard rules. Soft rule parameters may be prioritized in some implementations to maximize soft rule benefits in the final distribution.

In certain implementations the soft rules further comprise a second soft rule seeking to maintain RAID members of a given RAID group at a same device physical offset within a subset of storage members providing storage for the RAID group. In some implementations said maintaining of RAID group storage members at the device physical offset for all RAIDs may be determined to be a hard rule.

In some implementations the step of distributing the RAID protection within the distributed network of storage elements is implemented by defining a matrix based on a set of splits within a first hardware fault zone, and replicating the matrix into other fault zones until all RAIDs have a complete set of members.

In certain implementations the step of replicating the matrix comprises performing a sequence of matrix operations to define unique matrices in each of the other fault zones to cause members of each of the separate RAID groups to be stored on sets of distinct storage elements within the distributed network of storage element.

In some implementations the sequence of matrix operations comprises shifting rows of the matrix.

In certain implementations the sequence of matrix operations comprises transposing aspects of the matrix.

In some implementations the matrix is created by forming an optimal matrix template based on an optimal placement of members of the RAID groups such that no two RAID group members from separate RAID groups are stored on more than one storage element in common.

In certain implementations the matrix is created by reducing the optimal matrix template based on a number of storage elements in the first hardware fault zone of the distributed network of storage elements.

In certain implementations hardware constraints such as storage element quantities and availability of space in the hardware for storage elements may modify the method chosen to distribute RAID members on at least one storage element.

In some implementations the method further includes storing data within the RAID groups.

In some implementations, the storing of data in the RAID group may take the form of other types of erasure codes common in the art and which may be different in membership numbers, geographical distribution of said members, and protection redundancy characteristics from the original RAID initially used to determine one or more parts of such distributions.

In some implementations hardware and custom requirements may cause the storage elements to be grouped into at least two separate partitions, wherein each said partition may comprise one or more RAID types, and wherein each partition may treated as a separate sub-cloud.

In some implementations RAID storage members of two or more partitions occupying the same physical fault zone may be redistributed in the fault zone to further optimize the distributions in accordance to the soft and hard rule requirements.

In some implementations RAID storage members may be subdivided to conform to requirements of erasure codes common in the art that may be implemented from time-to-time.

In some implementations RAID storage members may be combined to form larger RAID spans in order conform to requirements of erasure codes common in the art that may be implemented from time-to-time.

In certain implementations the method further includes recovering data upon failure of a storage element for each split of the failed storage element from the distributed RAID protection within the distributed network of storage elements.

In some implementations the step of recovering data is performed in parallel for each of the splits of the failed storage element to accelerate data recovery.

In certain implementations the method further includes the step of distributing spare capacity within the distributed network of storage element by defining splits to be used to store data in the event of failure of a storage element within the distributed network of storage elements.

In another aspect, a distributed network of storage elements includes a processor, and instructions stored on a non-transitory tangible computer-readable media. When the instructions are executed, the instructions cause the processor to define at least two logical splits on each of the storage elements, provide RAID protection for the splits of the storage elements, and distribute the RAID protection within the distributed network of storage elements to minimize overlap between RAIDs on pairs of storage elements.

BRIEF DESCRIPTION OF THE DRAWINGS

FIG. 3 is functional block diagram showing an example placement of data volumes within the example distributed network of storage elements of FIG. 2.

FIG. 5 is a functional block diagram of another example distributed network of storage elements.

FIGS. 7-22 show example distributed networks of storage elements in connection with derivation of example algorithms for placement of RAID members within the example distributed networks of storage elements.

FIGS. 23-24 show partitioning of a set of storage elements to form logical groupings of storage elements within an example distributed network of storage elements.

FIGS. 25-27 show implementation of erasure codes within an example distributed network of storage elements.

DETAILED DESCRIPTION

Figure 1:
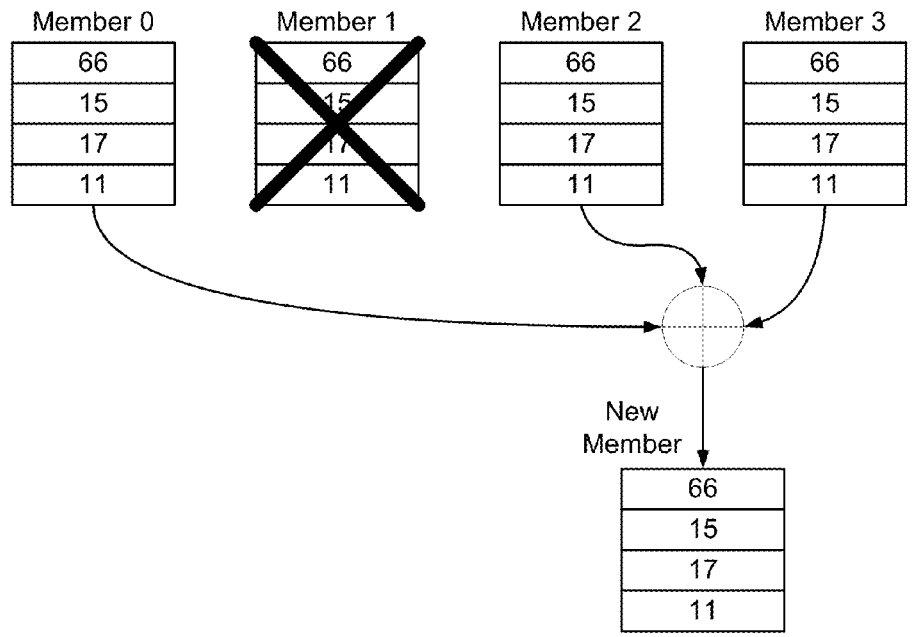
FIG. 1 is a functional block diagram of an example RAID storage system.

This disclosure is based, at least in part, on the realization that it can be beneficial to provide a distributed network of storage elements in which the physical capacity of each drive is split into a set of equal sized logical splits which are individually protected within the distributed network of storage elements using separate RAID groups. To reduce restoration latency, members of the RAID groups having a member in common on a given drive are spread within the distributed network of storage elements to minimize the number of sets of drives within the distributed network that have RAID members in common. By causing the splits to be protected by RAID groups, restoration of the splits may occur in parallel involving multiple drives within the distributed network of storage elements. By minimizing the overlap between RAID members on various drives, failure of a given drive will minimize or eliminate multiple reads from another drive in the distributed network of storage elements. Likewise, spare splits on other drives are distributed to enable write recovery to be performed in parallel on multiple drives within the distributed network of storage elements.

This document discloses the various ways by which data may be distributed across configurations of storage elements, and the method by which one of several methods may be chosen to best meet specific goals required from the storage elements as may be determined from the arrangement of data on the storage elements, said goals including but not limited to data reconstruction speed following failure, reliability, availability, performance and security. The method additionally provides flexibility for applications including various erasure codes while using the underlying RAID structure used to construct an initial distribution.

System Overview

A computer includes one or more central processing units and other hardware that together execute operations to allow the computer to process data. Storage systems have been developed to store data for one or more computers. Storage systems generally include multiple physical storage elements such as disk drives, and a storage system allocates storage capacity offered by the storage elements to enable the computer systems to store data and obtain access to data stored in the storage system. Storage systems may be local to the computer systems they serve, or may be distributed in other locations and accessed over a network.

In some implementations, the data written in the storage elements may be replicated on other storage elements located on geographically remote systems. One way to increase the reliability of a storage system is to replicate data onto separate storage elements using a data distribution scheme commonly referred to as Redundant Array of Independent Disks (RAID). Multiple RAID types have been developed, although some are more commonly used than others.

Commonly RAID has been implemented to enable a volume of data that is to be stored to be replicated and distributed across a set of storage devices. As used herein, the term storage device is used to refer to a non-volatile storage element configured such that if power is removed from the device, the data is not lost. One common example of a storage device is a disk drive, and throughout this description the term "drive" is often used instead of the more generic term "storage system". The techniques described herein are not limited to an implementation that uses drives, however, as the techniques described herein may be utilized in connection with any types of storage devices.

Where one of the drives in a RAID fails, the other data stored on the other drives associated with the RAID are used to recover the data that was stored on the failed drive. Over time, improvements in disc drives have enabled the amount of data stored on a particular disc to increase dramatically. While this reduces the cost of storage by allowing more data to be stored on a given device, it also increases the amount of time required to rebuild data stored on the device when a drive fails. Specifically, although the amount of data stored on the failed drive has increased, the speed at which the data may be read from and written to the drives has not increased at the same rate, thus causing rebuild times to increase dramatically.

In the current art, one way to reduce data reconstruction time was early identified notably by Garth Gibson and Mark Holland (1992) who describe a declustering scheme that could be used to accelerate data reconstruction of failed drives, principally by spreading rebuild and parity calculations across multiple drive controllers, the chief limiting factor at the time, with the intent on reducing parity calculations by said controllers, and determined a means to distribute RAID and parity members among a set of storage devices.

Schwabe et al (2002, 2004) describe ways of distribution using commutative rings, essentially a matrix algebra approach different from the methods described herein. Various other means are provided in the literature including IBM's GPFS (IBM General Parallel Filing System data sheet POD03073USEN.PDF) which declusters on a per-track and through a file management procedure to achieve performance and availability goals, and is an example of declustering related to file systems rather than distributions of RAID across storage elements.

Chained declustering (Hui-I Hsiao) algorithms have also been proposed but these require data to be replicated across nodes, not storage devices behind one node (for example) and it is considered that such replication is a costly procedure since the replicated data must be in disjoint sets of storage nodes which additionally adds to cost and reduction of storage capacity.

Other declustering techniques center around processor (controller) utilization and file oriented object RAID where the file is declustered and spread across, possibly, several RAID devices each of which is defined as an object. Such approaches however are not related to the low level RAID assignments at the storage device level.

In the aforementioned examples, constraints which include fault zone architectures such as power zones in storage systems, the arbitrary arrangements of storage elements in the fault zones, and optimality with respect to any arbitrary RAID and, more generally, erasure codes are not considered or are applicable only to specific types of RAID protection.

In this application we disclose techniques and systems to optimally decluster data according to sets of rules and select among multiple distribution methods to affect the optimal distribution to meet any valid configuration of storage elements for any RAID type. We disclose several ways of producing distribution maps, and show how the optimal quantities of storage elements can be calculated to enable specific conditions including the unity condition—defined in this patent—be met. We additionally show how one distribution may be selected and optimized against one or more rules.

FIG. 1 shows an example RAID 5 (3+1) in which data is stored across a set of four disk drives in a conventional manner. In the example shown in FIG. 1, the RAID has four members, each of which stores data associated with a set of volumes of data. In the illustrated example, the data volumes are labeled 66, 15, 17, and 11. As shown in FIG. 1, each member of the RAID maintains a portion of the data to be stored within the storage system. Hence, each of members 0, 1, 2, and 3 contain data associated with data volumes 66, 15, 17, and 11.

When a drive fails, a new member is selected and data is recreated and written to the new member from each of the other drives. For example in the illustrated example it has been assumed that member 1 of the RAID has failed. Data from members 0, 2, and 3 are collected and used to recreate the data volumes 66, 14, 17, and 11 on the new member. Essentially, this enables the new member to assume the role of failed Member 1 in the original RAID storage system.

Once all of the data affected by the failure has been written to the new member, the data is once again protected by the structure of the RAID storage system. However, during the recovery process, should another drive fail, e.g. if member 3 failed before the data could be restored to the new member, there is a possibility that the data may not be recoverable. Thus, integrity of the data is at risk during the recovery period.

In the illustrated example, recovery latency (the amount of time to recreate the data from the failed drive to the new member) is dictated by the read speeds of the other member drives, the write speed of the new member drive, and the amount of data to be moved to the new member. Depending on the amount of data involved, restoration may take anywhere from several minutes to many days.

Figure 2:
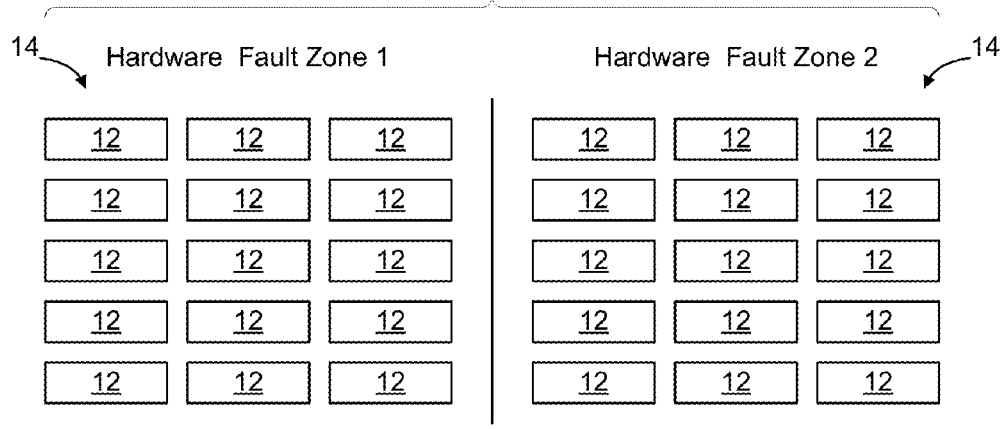
FIG. 2 is functional block diagram of an example distributed network of storage elements.

FIG. 2 shows an example distributed network of storage devices (elements). As shown in FIG. 2, the distributed network of storage elements 10 includes members 12 located in one or more hardware fault zones 14. The distributed network of storage elements may include any number of members and may include any number of hardware fault zones. Members 12, in one implementation, are disk drives having a capacity, for example, between 450 GB to 10 TB of storage capacity. Members 12 may have any desired capacity, however, depending on the particular implementation. Members 12 may be all of the same capacity or may have different capacities.

Hardware fault zones 14 may be implemented using similar numbers of members 12 or may have different numbers of members. Thus, for example, although hardware fault zone 1 and hardware fault zone 2 in FIG. 2 are both shown as having 15 members, the hardware fault zones are not required to have the same number or similar numbers of members.

Hardware fault zones provide redundancy against large scale hardware failure. Thus, for example, the hardware fault zones may be co-located in a particular data center but supported by separate power supplies and network access hardware. Likewise, different hardware fault zones may be located in separate geographic locations to provide geographic diversity. Multiple ways of providing hardware redundancy within the distributed network of storage elements may be used depending on the implementation.

FIG. 3 shows an example allocation of data within a set of drives of an example distributed network of storage elements. The set of drives in FIG. 3 may all be located within a given hardware fault zone or may be located in multiple hardware fault zones. This example shows a possible way in which data volumes 66A, 14A, 17A, and 11A may be allocated to members within the example distributed network of storage elements. As shown in FIG. 3, rather than select a set of 4 drives to implement the RAID, in the distributed network of storage elements the physical capacity of each drive is split into a set of equal sized logical splits 16.

Each of the splits of a given drive is a member of a RAID group such that each split on the device that contains data has that data maintained within a separate RAID protected group of other splits within the distributed storage system. In the illustrated example, portions of the data volumes 66, 14, 17, and 11 of the example discussed in connection with FIG.

1 are shown as data volumes 66A, 14A, 17A, 11A occupying splits 1, 2, 3, and 4 of Drive 1. A given data volume such as data volume 66 of FIG. 1 may occupy multiple splits within the distributed network of storage elements. Since each split is protected at the RAID level, the given data volume 66 may be protected by multiple RAID structures implemented at the split level. For convenience, only the distribution of a first portion of each of the data volumes of the example shown in FIG. 1 are shown in the example distributed network of storage elements shown in FIG. 3.

In an embodiment, the split size is selected based on the physical structure of the members making up the distributed network of storage elements rather than on the data to be stored within the distributed network of storage elements. For example, each drive may be separated into 16 or 32 logical splits of equal size. In one embodiment, each of the splits within the distributed network of storage elements is logically defined as having the same volume. In another embodiment different drives within the network may have different sizes and members of the RAID group are either (1) selected from splits of the same size or (2) the volume of data protected within the RAID group is limited to the smallest split forming the RAID group.

As shown in FIG. 3, rather than implementing the RAID at the drive level, RAID protection is at the split level. Data is optionally distributed within the distributed network of storage elements such that a given RAID member on one drive (e.g. 66A, 15A, 17A, or 11A) does not share another drive with another RAID member occupying another split on the drive. By minimizing the overlap between RAID members on various drives, failure of a given drive will not require multiple reads from another drive in the distributed network of storage elements. Likewise, spare splits on other drives are distributed to enable write recovery to be performed in parallel on multiple drives within the distributed network of storage elements.

For example, as shown in FIG. 1, data volume 66A is maintained by split 1 on drive 1, split 1 on drive 7, split 3 on drive 8, and split 4 on drive 11. Likewise, data volume 15A is maintained by split 1 on drive 1, split 1 on drive 2, split 2 on drive 3, and split 3 on drive 10. Data volume 17A is maintained by split 3 on drive 1, split 2 on drive 4, split 3 on drive 5, and split 3 on drive 9. Data volume 11A is maintained by split 4 on drive 1, split 4 on drive 6, split 2 on drive 12, and split 1 on drive 13.

As shown in FIG. 3, each of the splits on drive 1 is a member of a different RAID group, which has members distributed across drives in the distributed network of storage elements. Each of the RAID groups which has a member occupying a split of a given drive preferably has its members uniquely distributed throughout the distributed network of storage elements such that there are few sets of drives that have common RAID members. For example, in FIG. 3 none of drives 2-13 have a split that is a RAID member with more than one of the splits of Drive 1. The intent is for each split on a particular drive to have its other members uniquely distributed within the distributed network of storage elements such that its members do not share another drive in common with a RAID member of another split on the current drive.

If a drive has two or more members of RAID splits in common with another drive's splits, this is referred to herein as a RAID collision. The number of common splits between two drives is referred to as a RAID (or split) collision level Cl. A collision level of unity implies that the drives have a maximum of only one unique split in common (zero collisions, in effect).

If two drives have two or more splits (Cl>1) in common, then more than one split will need to be read in the event the other drive fails. This will slow rebuild. The write rate is governed by the availability of spare splits on other drives and whether there are sufficient drives to satisfy the condition of having no collisions.

Figure 4:
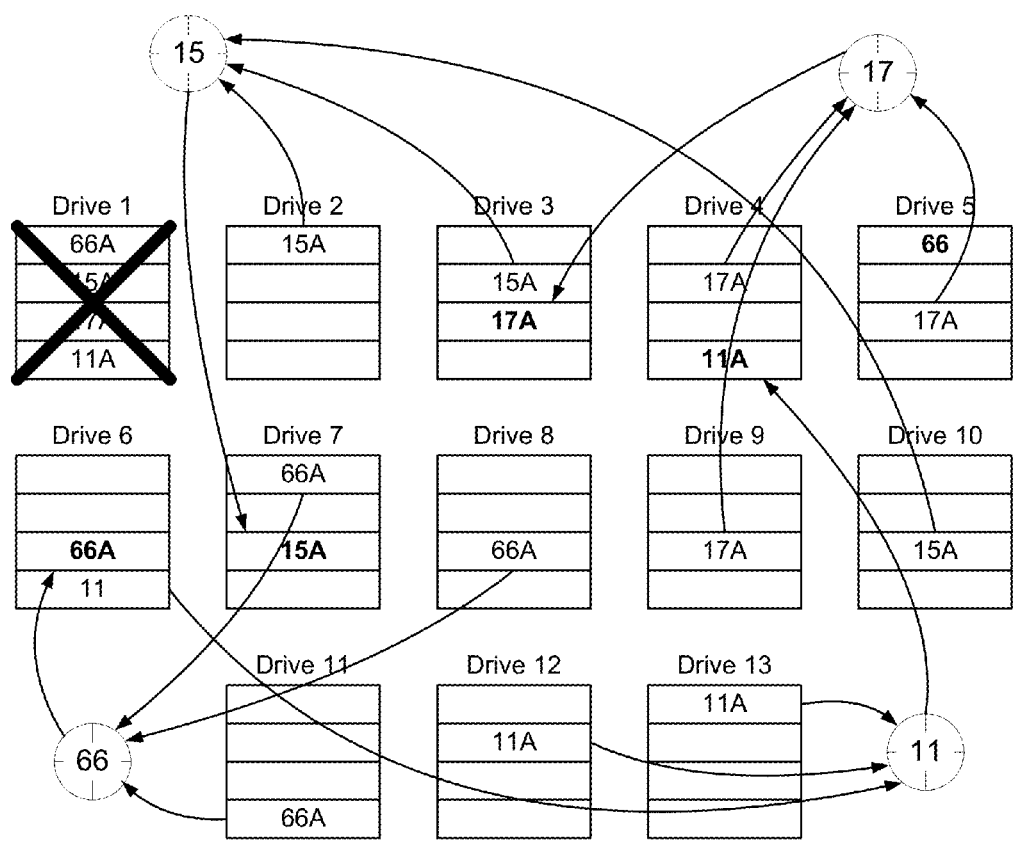
FIG. 4 is a functional block diagram showing restoration of data volumes within the example distributed network of storage elements of FIG. 2.

FIG. 4 shows a recreation process assuming a failure of drive 1. As shown in FIG. 4, when drive 1 fails it is necessary to recreate the data stored by drive 1 within the distributed network of storage elements. Since each split is a member of a separate RAID group, data within the separate RAID groups may be recovered in parallel from the redundant storage volumes within the distributed network of storage elements. By minimizing the numbers of splits on drive 1 which are stored in common on other storage elements of the distributed network of storage elements, it is possible to decrease the recovery period significantly.

For example, in FIG. 4, to recreate the data 66A of split 1 of drive 1, data is read from drives 7, 8, and 11 and then written into a spare split of drive 6. Likewise, to recreate the data 15A stored in split 2 of failed drive 1, data is read from drives 2, 3, and 10. By minimizing overlap between RAID groups within the distributed network of storage elements, it becomes possible to recreate the data of each of the failed splits in parallel by causing reads to occur from separate members of the distributed network of storage elements in parallel rather than causing entire drives to be read as was implemented in the past when RAID backup was implemented at the drive level. Likewise, since recreated data is able to be written in parallel to multiple spare splits distributed between other members of the distributed network of storage elements, the write operation may also occur in parallel.

FIG. 5 shows another example distributed network of storage elements in which the members of each of the RAID groups is distributed between hardware fault zones as well as between storage members. As in the example shown in FIG. 4, the goal is to minimize the number of RAID groups which have members in common on multiple storage members of the distributed network of storage elements. In the example shown in FIG. 4, a distribution of spare splits has been shown in hardware fault 1. In practice spare splits may be located in at least one hardware fault zone. In certain implementations, spare splits may be restricted to one fault zone. As shown in FIG. 5, hardware fault zones may have similar numbers of drives or may have different numbers of drives.

Figure 6A:
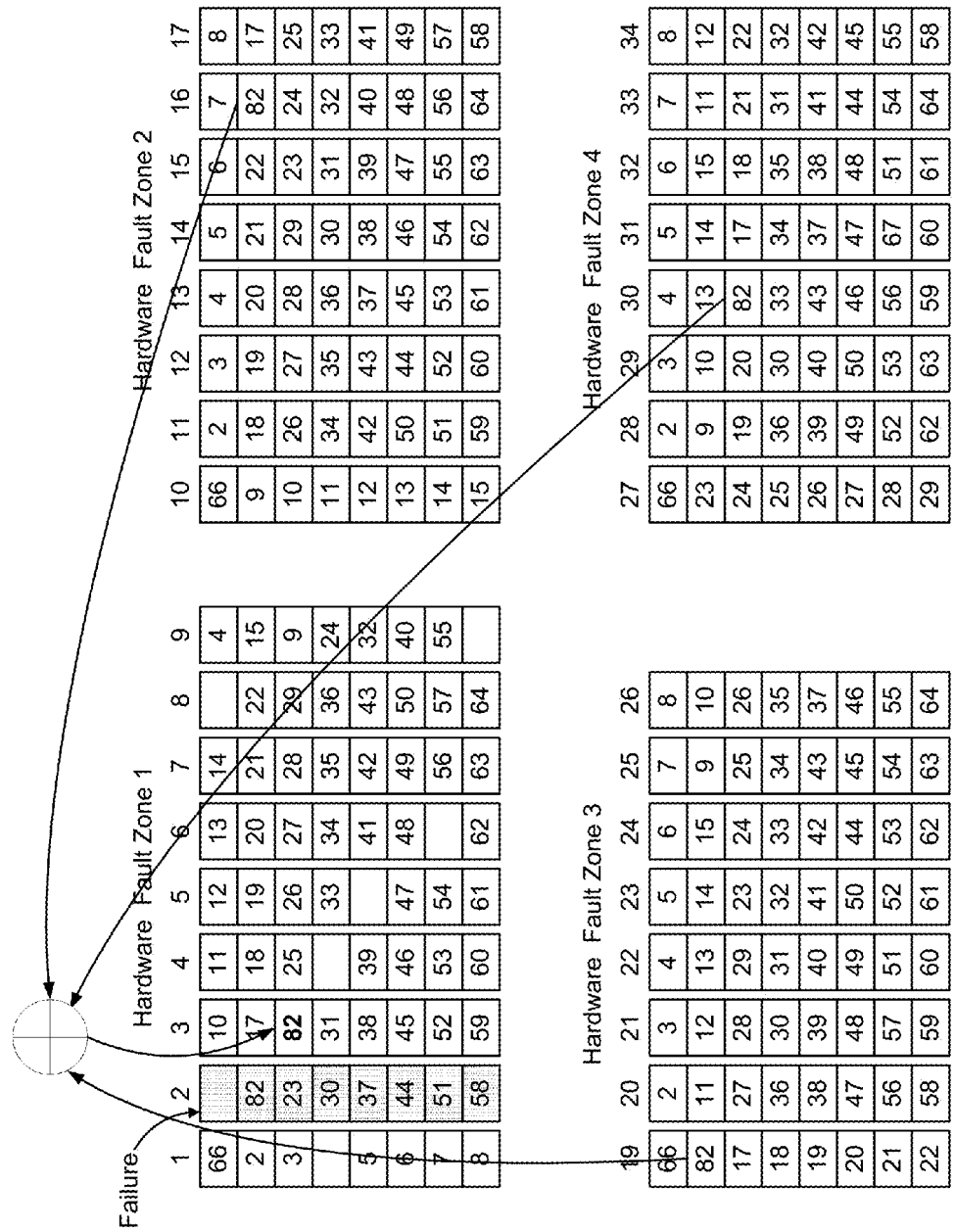
FIGS. 6A and 6B are a functional block diagrams showing restoration of data volumes within the example distributed network of storage elements of FIG. 5.
Figure 6B:
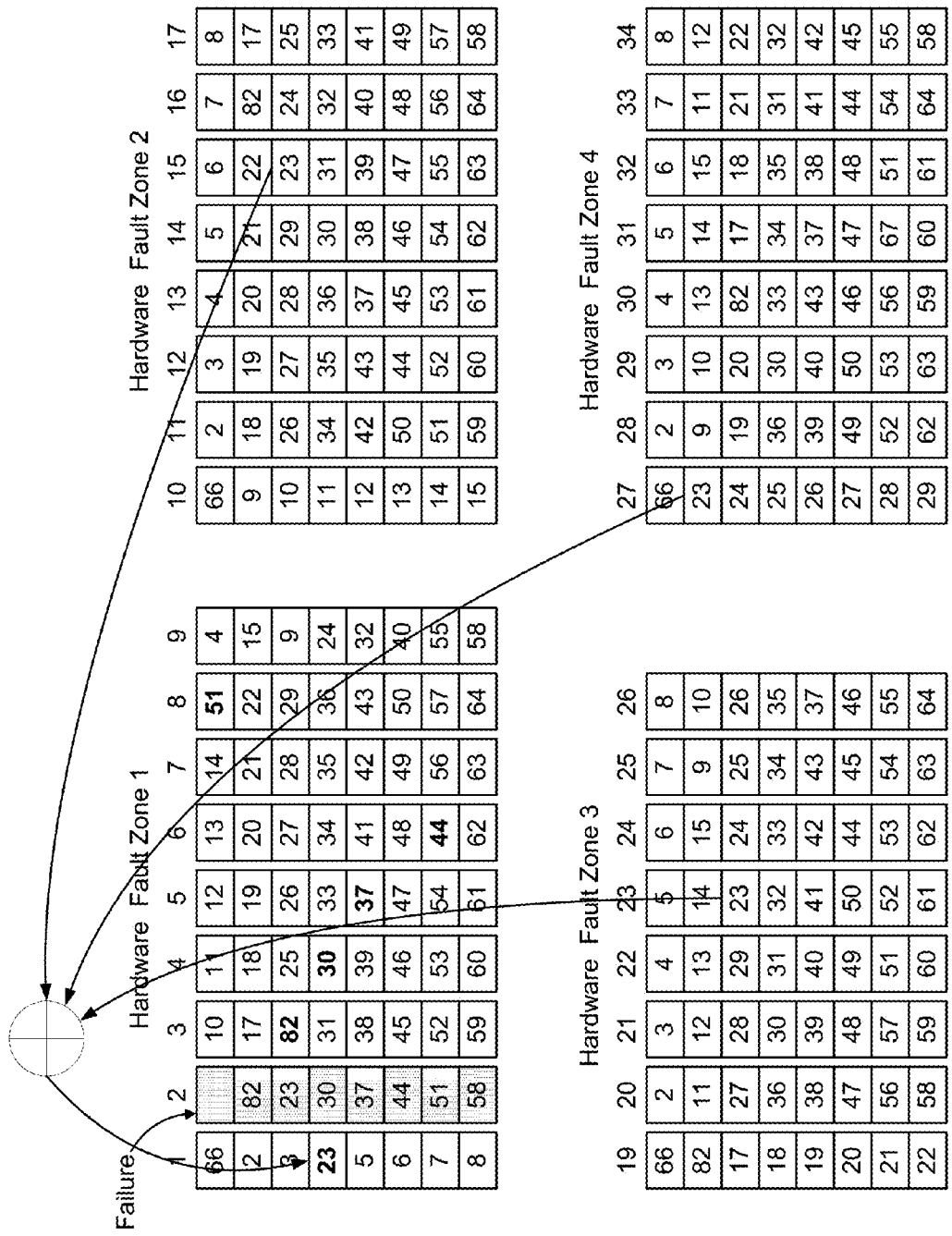

FIGS. 6A and 6B show recovery operations within the example distributed network of storage elements of FIG. 5, with the assumption that a failure has occurred in storage member 2 of hardware fault zone 1. As shown in FIG. 6A, to recreate the data stored in split 2, which is protected by RAID group 82, data is read in parallel from drive 16 in hardware fault zone 2, drive 19 in hardware fault zone 3, and drive 30 in hardware fault zone 4. The recreated data is then written to a spare split (split 3) on drive 3 in hardware fault zone 1. Independently, as shown in FIG. 6B, to recreate the data stored in split 3, which is protected by RAID group 23, data is read in parallel from drive 15 in hardware fault zone 2, drive 23 in hardware fault zone 3, and drive 27 in hardware fault zone 4. The recreated data is then written to a spare split (split 4) on drive 1 in hardware fault zone 1. Similar processes are implemented in parallel to recover the data stored in each of the other splits of the failed drive 2 to enable the data to be recovered within the distributed network of storage elements.

Although FIGS. 6A and 6B are shown separately for ease of visualization, these operations may occur in parallel since the recovery operations are decoupled and not dependent on each other for implementation. This enables each of the RAID groups to be independently restored such that the restoration time is dependent on the size of the split protected by the RAID group, the read speeds of the other members of the RAID group, and the write speed of the target device maintaining the spare split. Where the hardware fault zones are interconnected by a network, the transmission bandwidth of the network interconnecting the hardware fault zones may also impact the recovery latency.

However, since each of the splits of the failed drive is able to be restored in parallel (assuming no collisions) the overall restoration speed may be reduced on the order of the number of splits represented on the failed drive. For example, if the failed drive had 16 or 32 splits, the recovery time associated with restoration of the data maintained by the failed drive to other spare splits within the distributed network of storage elements likewise is on the order of 1/16 or 1/32 the amount of time it would take to restore the data where RAID is implemented on the drive level as discussed above in connection with FIG. 1.

Since each of the RAID groups at the split level is independent of each of the other RAID groups, the distributed network of storage elements is able to store data that is protected by multiple different types of RAID protection schemes. For example, in the illustrated example it was assumed that the data stored in split 2 and the data stored in split 3 of failed drive 2 was both protected by RAID 5 (3+1). Alternatively one of these storage volumes could have been protected by a different RAID protection scheme, e.g. RAID 5 (7+1). The RAID group selected for protection of a split within the distributed network of storage element is based on the RAID protection scheme associated with the data to be stored in the storage system. Since each of the splits is protected by a RAID group that is uniquely distributed and formed between other splits on other members of the distributed network of storage elements, it is possible to have multiple RAID types stored and allocated between the same members of the distributed network of storage elements. Likewise, any number of drives may be utilized within the distributed network of storage elements and any number of splits (greater than 1) may be used to implement the members within distributed network of storage elements.

In operation, allocation of RAID groups to splits of members of a distributed network of storage elements in a manner that minimizes collisions is desirable. Preferably the manner in which the RAID groups is allocated is able to be implemented automatically without human intervention.

In the following sections, three proposed algorithms are discussed which enable the placement of RAID groups to storage members in a manner that minimizes collisions. These three proposed algorithms are (1) heuristic based; (2) Shift matrix method, and (3) matrix transpose method. Each of these proposed algorithms is discussed in greater detail below. Optimally, a placement algorithm would enable RAID group members placement within the distributed network of storage elements such that splits of a given RAID group are distributed between hardware fault zones such that at most one member of a RAID group is implemented within a given hardware fault zone. Likewise, only one split of a given RAID group should be stored on a given member. If possible, it is desirable to keep splits of a given RAID group at the same split level of the selected members (e.g. if one of the split of a given RAID group is stored in split #2 on a first device, then all of the other splits of the RAID group will also be stored on split #2 in their respective devices) to enable more uniform seek times when reading data to perform a data restoration process. In some implementations, this may comprise a hard or soft rule for operational performance requirements. Finally, it is desirable to keep the collision level as close to 1 as possible by minimizing the overlap between members which have RAID group members in common. Spare space likewise should be distributed across the members of the distributed network of storage elements since rebuild is accelerated through the distributed use of spare splits.

The heuristic algorithm involves placement of RAID group members according to rule. Specifically, in this algorithm a systematic pattern of RAID group members is created on an array of drives in such a manner as to obey a set of constraining rules relating to fault recovery within the system. For example, in a heuristic placement algorithm RAID device members are placed on a grid defined by splits and drives in which the placement of a RAID device will have members placed in other drives in and other locations in the system which obey a set of hard rules of placement and attempt to optimize a set of soft rules of placement. An example set of hard rules may include: (1) that splits of a given RAID group are distributed between hardware fault zones such that at most one member of a RAID group is implemented within a given hardware fault zone; and (2) that only one split of a given RAID group should be stored on a given member, e.g. no RAID has two members on the same device. The hard rules, in this example, relate to rules that are implemented to protect the data against hardware failure and other types of failure to help ensure the ability of the data to be restored in the event of failure. An example set of soft rules may include rules relating to optimizing performance of the distributed network of storage elements, such as rules relating to placement of splits at the same split level within the array or rules relating to placement that minimizes collision level within the system, and splits where the expected load of requests for input and output of data may need to be more optimally distributed or remain below a specified level.

The matrix methods create a matrix from a set of drives divided into splits which are placed in one fault zone, and replicates the matrix into other fault zones until all of the RAID devices have a complete set of members. In each zone a sequence of matrix operations is performed, including transposition and or unique shifting of rows or modules to create drives which have as unique combinations of RAID devices as possible given the quantity of devices and fault zones.

The method of distribution may be determined that the distribution meet specific requirements. For example, if all splits of at least one RAID group are required to reside at the same physical access latency time as on other drives, the matrix method with only shift vector operators may be employed. Alternatively, for specific cases where the number of RAID members equals the number of splits on any one storage element, and the requirement of no members of any two RAID groups may be on any one storage element, and there are sufficient storage elements equal to number of splits per element squared, it is known that the heuristic algorithm meets this requirement exactly, but at least one matrix may not. In other implementations, both distributions may be run to produce configuration maps, and said maps analyzed by a simulation of failures of storage elements which produces metrics to determine which distribution method best meets the requirement. The map of the determined best method is then used to create the distribution for the specific configuration of storage elements.

1 RAID Member Placement Algorithms

Drives are divided up into splits where each split may be assigned as a member of RAID group. Generally, but not necessarily required, the physical capacity of each drive is divided into a set of equal sized logical splits, where each split is capable of containing one or more logical volumes. RAID protection is at the split level. Logical volumes addressed by host computers and servers may be assigned part of a RAID group or may encompass at least one RAID group, depending on the application. The differences with traditional RAID grouping are summed up below.

1. Each split is a member of one RAID group. For R drives in a RAID group, there are normally (R−1) other drives containing the remaining splits of the RAID group.
2. The intent is to have each split on a particular drive assigned to a RAID group such that the members of each RAID group are uniquely distributed and do not share more than one drive with the members of any other RAID group in a given (defined) set of drives. When a system of drives meet this requirement, and all RAIDs within the drives are fulfilled, they may be said to have achieved the unity condition. The unity condition is broken if either or both of the following conditions exist:
   a. If at least two drives have two or more RAID group members (collision level is then $q_L>1$—for definitions see below) in common, then more than one split will need to be read (instead of the ideal of one) in the event a drive fails which contains these two or more RAID groups. This will slow the rebuild. The read time of the data will then be limited by the drive which has the highest $q_L$ needed to reconstruct the data of the failed drive.
   b. The write rate is governed by the availability of spare splits, If two or more spare splits on any one drive are determined as the best spare locations to use to rebuild the data of any RAID Group, the drive with the highest number of spare splits to be used determines the write collision level, and hence the write time, for the data reconstruction.

The above is to be compared with traditional practices where, for example, logical volumes are assigned splits across the same group of drives known as an affinity group. For example, a RAID5 7+1 with a designated affinity group of eight drives could have sub-sets of the same drives used for volumes with RAID1 and RAID5 3+1 volumes, each volume begin forced to remain within the subgroup of drives for that RAID type. Fault boundaries are then distinct even in the subgroups and RAIDs are not allowed to cross each subgroup: by contrast, the striping model breaks the fault boundaries. In this traditional construct, the read collision level in the affinity group is equal to the number of RAID groups defined on them. In the event of a drive failure and subsequent rebuild, each remaining drive in the group must have all the data on it read, and the write is to one single drive, designated as the spare drive, indicating write collision level equal to the number of splits.

The rebuild time is governed by the maximum of the read time and the write time, or a combination of the two when reads and writes may occur simultaneously or separate and delayed. In turn, the read and write times are governed by the rate by which data is read and data is written to the drive and additionally by the quantity of data read or quantity written to a drive. Since the maximum quantities of data read from and maximum quantities written to any one drive during data reconstruction are directly related to the read and write collision levels respectively, the degree of shortening of the data reconstruction time is directly dependent on the read and write collision levels. Consequently, the intent is to minimize collision levels for both reads and writes.

Definitions

Definitions of terms used in this patent are as follows:

RAID Cloud Definition

A fixed set of drives containing data wherein the failure of any one element or drive within the set of drives can be reconstructed by using the data from at least one other element within the same set of drives without the requirement of seeking data external to the set of drives. In addition, the failure of any element or set of elements within the cloud with assigned redundancy derived from the erasure code or RAID of said element does not constitute a failure of the cloud in whole or in part.

Split

A split is a unit volume of a disk which is less than the total volume of the drive. A split, if assigned to a RAID group, is assigned to only one RAID type at a time. A split may be used in a storage device in at least one of the following ways:

A data split is a split assigned to support data and assigned as the member of at least one RAID Group A spare split may be used to reconstruct data from a failed drive.

An Unassigned split may be assigned as a spare split or as a data split

A Reserved Split is a split that is reserved capacity and may not be assigned as spare or data split.

RAID/Erasure Code Fulfillment

A RAID Group is said to be fulfilled when sufficient splits are assigned to the RAID set to meet the minimum membership requirement of the RAID (or erasure code) and which meet any hard predetermined rules.

Drive Spread (NS)

For each drive in the RAID Cloud, this is the count of the number of drives which have members of the RAID Groups that are present on the specified drive. If the unity condition is met, for $Q_D$ data splits on a drive, the spread is $(R-1)Q_D$ other drives.

RAID Identity

A RAID identity is an identifier assigned to a split marking it as one member of a specific RAID Group. Normally, the RAID identifier is a numeric value but may be any designation such as hex numbers or alphanumeric characters. Generally, RAID Group and RAID identity in this description are considered synonymous for purposes of RAID group assignment of splits. In some implementations, RAID members may be uniquely identified for a specific function such as for parity data or rank order in a RAID or erasure code membership.

RAID Spread (Drives)

The RAID spread (Drives) is the number of drives needed to fulfill a RAID Identity. Normally, this is the same as the RAID Spread (Splits) but conceivably could be different for e.g. RAID6 or when rules are broken in 'desperation' placement in order to avoid immediate data loss.

RAID Spread (Splits)

The RAID spread (splits) is the number of split assignments needed to fulfill a RAID Identity. Normally, this is the same as the RAID Spread (Drives) but conceivably could be different for e.g. RAID6 or when rules are broken in desperation placement and more than one split is placed on one drive.

RAID Collision Definition

A RAID collision occurs when any one RAID group shares more than one common drive with at least one other RAID group (see below).

Collision Level q/Read Collision Level/Write Collision Level

In the event of a data reconstruction, the maximum number of splits on a single drive in the spread of drives that must be read to rebuild the data. For splits used as targets for data reconstruction, the write collision level is the maximum number of splits used for data reconstruction on any one drive during the data reconstruction process.

Unity Condition (or Constraint)

No RAID set is so configured as to have a read collision level $q_L > 1$. Alternatively, all read collisions are $\leq 1$.

Mean Collision Level $q_C$

Over a given set of drives or all drives in a RAID Cloud, the mean collision level is the weighted average of read (or write) Collision levels (weighted mean read collision level) or write collision level (weighted mean write collision level) on all drives in the set of drives. The read and write mean collision levels may be calculated as figures of merit for the final distribution Exact Solution An exact solution is one where a set of drives have all data splits assigned to RAIDs and all RAIDs are fulfilled in the set of drives and no RAID group has a member outside the set of drives, and in which hard rules related to fault zones are obeyed.

Compact Exact Solution

A Compact Exact solution is the minimum number of drives required to meet the unity condition without regard to physical or other constraints such as power fault zones or logical addressing requirements. It is known that not all exact solutions have equivalent compact exact solutions, the conditions for which are detailed below.

Desperation Placement

Desperation placement is the placement of data in a spare or reserved split wherein least one hard rule is broken in order to ensure data integrity.

Incomplete and Complete Drives

A drive is incomplete if at least one split on the drive remains unintentionally unassigned to a RAID Group, spare split, unassigned condition, or reserved split.

Figure 7:
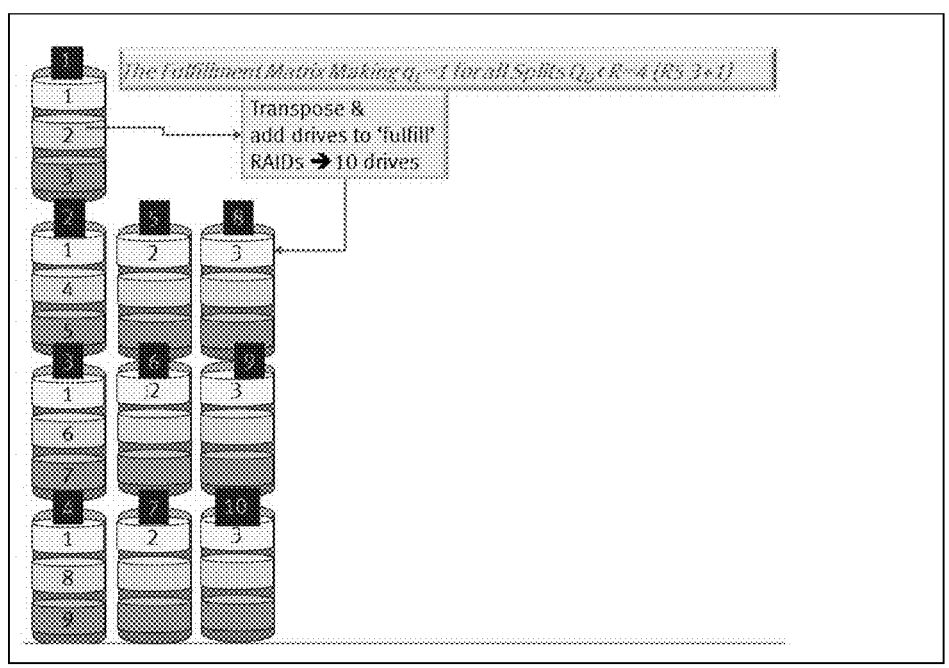

2 Collision Levels of Unity: Solutions and Methods 2.1 Exact Solution Example & the Fulfillment Matrix Definition Step 0—$F_0$ Initial Split Matrix Consider the simple case, shown in FIG. 7, in which of a set of drives is provided. The first drive includes three RAIDs per our above definitions implemented using RAID5 3+1.

Step 1—$F_1$ Fulfillment Matrix

To fulfill each RAID split, and maintain a collision level of unity, three more drives are required per split. In general, for R drives per RAID, each split generates (R-1) other drives. Thus for Step 1 the number of drives in the spread is:

$$N_{s2}=1+Q_D(R-1) \qquad 1.$$

We note that none of the RAIDs on the original drive of Step 0 can be assigned to any of the other RAIDs without breaking the unity rule $q_L=1$. Consequently, new RAIDs are generated. Note that in this step, a minimum number of new RAID 'opportunities' are created $R-1 \times Q_D-1$.

The total number of RAIDs $N_{R2}$ after Step 2 is:

$$N_{R2} \geq Q_D+(Q_D-1)(R-1) \qquad 2.$$

The original $Q_D$ splits of Step 0 have been fulfilled by Step 1. If we define the fulfilled set by $S_F$, and the unfulfilled set by $S_{UF}$, we see that at the start of Step 1

$$[1 \ldots Q_D]\varepsilon S_F$$

$$[Q_D+1 \ldots Q_D+(Q_D-1)(R-1)]\varepsilon S_{UF} \qquad 3.$$

It can also be seen that the number of unassigned sets of splits created by this method is also given by $$\text{Unassigned Sets}=(Q_D-1)(R-1)]\varepsilon S_{UF} \qquad 4.$$

This is informative because it means that for fulfillment to occur the number of sets of unique numbers meeting the unity requirement must be generated from the existing RAID identities if an 'exact' solution is to be found.

We note that the number of unassigned splits in the second step (prior to any assignment in Step 2) is given by:

$$\text{Unassigned Splits (Step 2)}=(Q_D-1)^2(R-1) \qquad 5.$$

The objective is to fulfill the RAIDs in $S_{UF}$. In the example, the number of outstanding RAIDs is $(Q_D-1)(R-1)-(Q_D+1)+1=(4-1)*(3-1)-(3+1)+1=6$ The unfilled RAID numbers are the range $$[4 \ldots 9]=(Q_D+1) \ldots (Q_D-1)(R-1)+Q_D=[(3+1) \ldots 3+(3-1)(4-1)]=[4 \ldots 9].$$

The six RAIDs are numbered 4 thru 9, which of course is the range. This is the objective of Step 3

Step 2

The first point to note is that the RAID numbers in this formalism are aligned in rows per drive. Splits with RAIDs #4 and #5 for example are on the same drive, and cannot, given the unity rule, share another drive. Hence it suggests writing $$\binom{4}{5} \rightarrow (4 \ 5). \qquad 6$$

If each column is a separate drive in equation 6, then the RAIDs are naturally separated. We can extend this idea and create a matrix of the RAIDs that are 'unfulfilled', which is referred as the Fulfillment Matrix F.

$$\binom{4}{5} \qquad 7$$

$$\binom{6}{7} \rightarrow F = \begin{pmatrix} 4 & 5 \\ 6 & 7 \\ 8 & 9 \end{pmatrix}$$

$$\binom{8}{9}.$$

Theorem I: Exact Solution Theorem

Exact Solution Theorem: An exact solution exists if the number of unique combinations of RAIDs in the Fulfillment matrix, meeting the unity condition, is equal to or greater than the number of unfilled drives of the prior step.

It is possible to see this in the simple example. To 'fill' the partially complete drives, 6 pairs of RAIDs are required. The fulfillment matrix has six numbers, which must be taken two at a time and the order of the pairs is unimportant (hence combinatorial not permutations), and consequently the number of combinations is:

$$\frac{6!}{(6-4)!2!} - 2\frac{3!}{(3-2)!2!} - 3 = 15 - 6 - 3 = 6. \qquad 8$$

The second term is the number of combinations disallowed in the two columns of F which represent the two drives generated in this step. The third term (subtracting 3) is for the original set of 3 number pairs that produced the fulfillment matrix i.e. (4, 5), (6, 7) and (8, 9). This yields 6 unique pairs, precisely the number required to make the solution exact. Therefore, an exact solution exists according to the theorem.

The general equation can be obtained from this analysis. The number of combinations of numbers that can be obtained from the Fulfillment matrix is $$\frac{N!}{(N-n_S)!n_S!} - n_C \frac{n_R!}{(n_R-n_S)!n_S!} - n_R. \qquad 9$$

Where $n_S$=number of unassigned splits in one incomplete drive (same for all drives)

$n_R$=number of rows of $F$ $n_C$=number of columns of $F$     10.

$N=n_R \times n_C$=total number of splits

In Step 2, we have the following relations when $Q_D<R$:

$n_R=R-1$ $n_C=Q_D-1$ $n_S=Q_D-1$

Combining with the number of unfilled drives, we arrive at the condition for theorem I:

$$\frac{N!}{(N-n_S)!n_S!} - n_C \frac{n_R!}{(n_R-n_S)!n_S!} - n_R \geq (Q_D-1)(R-1). \qquad 11$$

We note that a compact exact solution likely exists when condition Equation 11 is met as well as the conditions $n_R=n_S$ or $R=Q_D$.

Theorem II: Exact Compact Solution Theorem

Exact Compact Solution Theorem: A Compact Solution exists if Theorem I, condition is met and in addition the number of rows of the Fulfillment Matrix is the same as the number of unassigned splits in the unfilled drives.

Figure 8:
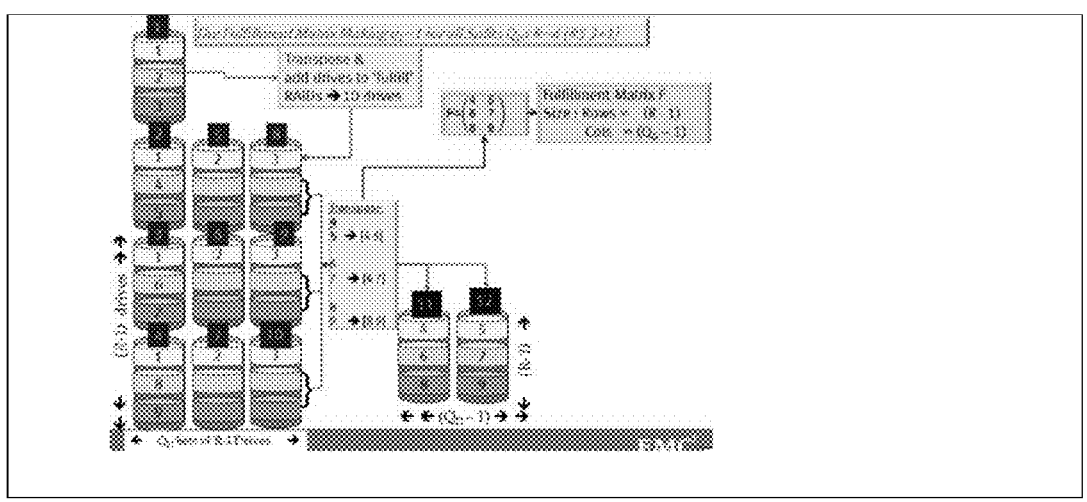
Figure 9:
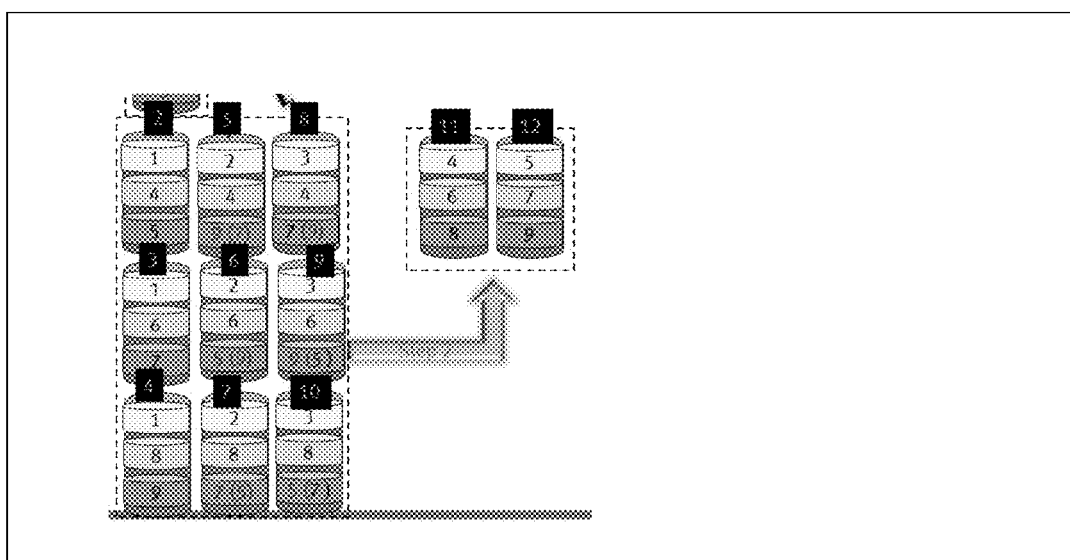

FIG. 8 shows an example of the Generation of the Fulfillment Matrix F and the related dimensionality. FIG. 9 shows the exact solution(s). Note the two sets of solutions, where the second set is indicated by the numbers in parenthesis: essentially, one may obtain the two solutions by switching columns for drive numbers 5 thru 10. Consequently, there generally are more arrangements of the sets than one. In some implementations one arrangement may be chosen over another, depending on specific criteria or rules.

3 Solution Degeneracy and Procedure to Generate the Sets for Unassigned Splits

Even though sets of RAID group numbers can be generated to fill the drives of Step 1, it turns out that the arrangement of the sets among the drives is non-trivial. In the example it is easy to pick out cases where the sets of numbers generated will 'clash' and break the unity rule. For example, in FIG. 9, placement of arrangements (4,9) and (6,9) on drives 5 and 6 would break the rule.

In larger problems this may become computationally intensive, but a way is suggested here to do so by performing a set procedure which creates ordered sets of column vectors that can fulfill the requirement in an orderly way and avoid computationally attempting to assign the sets without breaking the unity condition while obtaining optimum solutions for custom requirements.

Each set of RAID numbers may be thought of as a column vector with a 1:1 relationship to the unfilled drives and their order. From Drive 5 to 7, for example, the solution pairs are (4,9)-(6,5)-(8,7). This sequence is exactly followed in (b) of FIG. 10. Similarly, sequence (c) generates the values for drives 8 thru 10. The order in which the number sets are generated can naturally lead to placement without the painstaking computational attempts.

FIG. 10 shows Generation of number vectors, in which column (a) shows how an 'anchor' RAID and sub-matrix can create sets of column vectors $C_{ij}$ shown in column (d). Columns (b) and (c) show the sequences to fulfill all splits and RAIDs and generate the vectors in column (d). The sequences correspond to the placements of the RAID identities shown in FIG. 9. Note that moving down rows in sequence provides the proper sequence of numbers.

Compact Exact Solution Example and Shift Matrix

Figure 11:
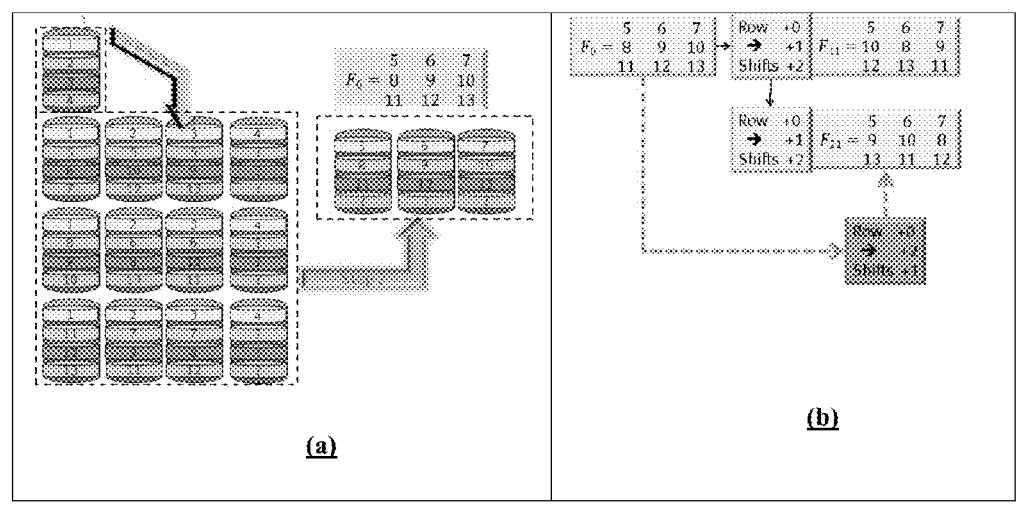

In FIG. 11 a compact exact solution is demonstrated for RAID5 3+1 and $Q_D=4$. The fulfillment matrix is generated in (a), and it is quickly seen that the missing vectors must be three rows deep, and there are nine from the first step (the numbers for the first three columns are filled in).

To generate the column vectors, a shift technique is employed. Note each row is shifted to the right by a different amount than other rows, and wraps to the first column. Two shifts enable a full set to be generated (all nine required column vectors), and the solution is easily made.

$F_{21}$ can equivalently be generated by switching the shifts between the second (set to two shifts) and third (set to one shift) rows. Unique row shift configurations then yield unique column vectors. Consequently it is conceivable that a simpler method exists to solve more complex problems through shifting the rows to obtain unique combinations. A vector operator with dimensions of the number of possible shift combinations and numbers, one per row of the fulfillment matrix, indicating the degree of a row shift. A matrix can then be put together consisting of all unique shift operators.

FIG. 11 shows an example in which an Exact Compact solution is generated. In (a) the fulfillment matrix is generated; (b) illustrates the shift method to generate solution column vectors.

The first condition for exactness is easily seen. Using $n_S=3$ $n_R=3$ $n_C=3$ $N=n_R \times n_C=3 \times 3=9$ $Q_D=4$.

$R=4$ we have $$\frac{9!}{(9-3)!3!} - 3\frac{3!}{(3-3)!3!} - 3 = 78 \gg (4-1)(4-1) = 9$$

and, hence, $n_R=n_S$.

Shift Matrix for Exact Solution Case

As indicated above, shifting each row a unique amount defines a unique sequence. The question arises if the sequences are consistent with the ordering requirement.

Returning to the simple Exact solution described above, let us define a shift operator matrix S with the following characteristics for the Exact Solution case:

$$S = \begin{pmatrix} 1 & x & 0 \\ 0 & 1 & x \\ x & 0 & 1 \end{pmatrix}. \quad (12)$$

x indicates that a row is 'excluded' from the column vector (or we may regard the matrix like a tensor in which one or more columns have been 'contracted'). The value '1' is used as the matrix operation is to shift the rows column-wise of the fulfillment matrix, which only has two columns. A second shift merely assigns the value to its original position, as it must wrap around.

Note that a column swap may provide additional solutions for higher order matrices.

We noted that the fulfillment matrix in Equation 7 consists of three X two matrix $$F = \begin{pmatrix} 4 & 5 \\ 6 & 7 \\ 8 & 9 \end{pmatrix}$$

Thence, we consider that the shift matrix operation $$S \circ F = \hat{s}_{ij} f_{ik} = f_{ik \leftarrow 1 + \text{mod}\left[\frac{(k+s_{ij}-1)}{n_c}\right]}. \quad (13)$$

where $n_C$ retains its original meaning as the number of columns of the fulfillment matrix.

In general, the values any $s_{ij}$ are in the range [0, 1 . . . $n_C$−1;x]. "x" indicates the row is skipped since normally the fulfillment matrix row count is greater by one than the required set of numbers to complete a drive. I.e. where $s_{ij}$ is the row shift increment of the jth shift column vector. Note the index shift algorithm shifts the value at index [i, k] to the index [i, k'] where $$k \to k' = 1 + \text{mod}\left[\frac{k + s_{ij} - 1}{n_c}\right]. \quad (14)$$

Note each shift can give rise to multiple numeric column patterns, but each column represents a solution under a prior RAID.

$$S \circ F = \begin{pmatrix} 1 & x & 0 \\ 0 & 1 & x \\ x & 0 & 1 \end{pmatrix} \circ \begin{pmatrix} 4 & 5 \\ 6 & 7 \\ 8 & 9 \end{pmatrix} = \begin{pmatrix} 5 & 4 \\ 6 & 7 \\ x & x \end{pmatrix}, \quad (15)$$

$$\begin{pmatrix} x & x \\ 7 & 6 \\ 8 & 9 \end{pmatrix}, \begin{pmatrix} 4 & 5 \\ x & x \\ 9 & 8 \end{pmatrix} = \begin{bmatrix} 4 & 5 & 7 \\ 9 & 6 & 8 \end{bmatrix} \oplus \begin{bmatrix} 4 & 5 & 6 \\ 7 & 8 & 9 \end{bmatrix}.$$

We can define an 'inverse' shift matrix $\tilde{S}$ with counter-diagonal elements:

$$\tilde{S} \circ F = \begin{pmatrix} x & 0 & 1 \\ 0 & 1 & x \\ 1 & x & 0 \end{pmatrix} \circ \begin{pmatrix} 4 & 5 \\ 6 & 7 \\ 8 & 9 \end{pmatrix} = \begin{pmatrix} x & x \\ 6 & 7 \\ 9 & 8 \end{pmatrix}, \quad (16)$$

$$\begin{pmatrix} 4 & 5 \\ 7 & 6 \\ x & x \end{pmatrix}, \begin{pmatrix} 5 & 4 \\ x & x \\ 8 & 9 \end{pmatrix} = \begin{bmatrix} 4 & 5 & 6 \\ 7 & 8 & 9 \end{bmatrix} \oplus \begin{bmatrix} 4 & 5 & 7 \\ 9 & 6 & 8 \end{bmatrix}.$$

We note this counter matrix yields the solution set, only the columns are in reverse order, but provide the second ordered solution.

Shift Matrix for the Compact Exact Solution

Again, taking the fulfillment matrix for the Compact Exact solution, one has:

$$F_1 = \begin{pmatrix} 5 & 6 & 7 \\ 8 & 9 & 10 \\ 11 & 12 & 13 \end{pmatrix}. \quad (17)$$

The shift matrix for this can have elements $s_{ij}$=[0,1,2] since the modulo in the column-wise direction is '3'. Hence the shift matrix can be written in the form:

$$S = \begin{pmatrix} 1 & 2 & 0 \\ 0 & 1 & 2 \\ 2 & 0 & 1 \end{pmatrix}$$

Note there are no repeats, and the matrix diagonal is kept as unity. Thence $$S \circ F_1 = \begin{pmatrix} 1 & 2 & 0 \\ 0 & 1 & 2 \\ 2 & 0 & 1 \end{pmatrix} \circ \begin{pmatrix} 5 & 6 & 7 \\ 8 & 9 & 10 \\ 11 & 12 & 13 \end{pmatrix} = \begin{pmatrix} 7 & 5 & 6 \\ 8 & 9 & 10 \\ 12 & 13 & 11 \end{pmatrix}, \quad (18)$$

$$\begin{pmatrix} 6 & 7 & 5 \\ 10 & 8 & 9 \\ 11 & 12 & 13 \end{pmatrix}, \begin{pmatrix} 5 & 6 & 7 \\ 9 & 10 & 8 \\ 13 & 11 & 12 \end{pmatrix} =$$

$$\begin{pmatrix} 7 & 6 & 5 \\ 8 & 10 & 9 \\ 12 & 11 & 13 \end{pmatrix} \oplus \begin{pmatrix} 5 & 7 & 6 \\ 9 & 8 & 10 \\ 13 & 12 & 11 \end{pmatrix} \oplus \begin{pmatrix} 6 & 5 & 7 \\ 10 & 9 & 8 \\ 11 & 13 & 12 \end{pmatrix} = \begin{pmatrix} 5 & 6 & 7 \\ 9 & 10 & 8 \\ 13 & 11 & 12 \end{pmatrix}.$$

Inspection shows this yields one set. To obtain other sets we make use of the inverse shift matrix obtained by changing to the anti-diagonal by 'reflecting' across the middle row (an equivalent technique would be to switching rows in the fulfillment matrix and applying the same shift matrix, but there may be benefits to focusing on the shift matrix).

$$S \to \tilde{S}: \begin{pmatrix} 1 & 2 & 0 \\ 0 & 1 & 2 \\ 2 & 0 & 1 \end{pmatrix} \to \begin{pmatrix} 2 & 0 & 1 \\ 0 & 1 & 2 \\ 1 & 2 & 0 \end{pmatrix}. \quad (19)$$

-continued $$\tilde{S} \circ F_1 = \begin{pmatrix} 2 & 0 & 1 \\ 0 & 1 & 2 \\ 1 & 2 & 0 \end{pmatrix} \circ \begin{pmatrix} 5 & 6 & 7 \\ 8 & 9 & 10 \\ 11 & 12 & 13 \end{pmatrix} = \begin{pmatrix} 6 & 7 & 5 \\ 8 & 9 & 10 \\ 13 & 11 & 12 \end{pmatrix}, \quad (20)$$

$$\begin{pmatrix} 5 & 6 & 7 \\ 10 & 8 & 9 \\ 12 & 13 & 11 \end{pmatrix}, \begin{pmatrix} 7 & 5 & 6 \\ 9 & 10 & 8 \\ 11 & 12 & 13 \end{pmatrix} =$$

$$\begin{pmatrix} 5 & 6 & 7 \\ 10 & 8 & 9 \\ 12 & 13 & 11 \end{pmatrix} \oplus \begin{pmatrix} 5 & 6 & 7 \\ 10 & 8 & 9 \\ 12 & 13 & 11 \end{pmatrix} \oplus \begin{pmatrix} 5 & 6 & 7 \\ 10 & 8 & 9 \\ 12 & 13 & 11 \end{pmatrix} = \begin{pmatrix} 5 & 6 & 7 \\ 10 & 8 & 9 \\ 12 & 13 & 11 \end{pmatrix}.$$

Indeed, this gives the other set of values used to complete the Compact solution.

Suppose in equation 19 the row of each column is shifted up one. This makes the diagonal value "0" instead of "1". We then have:

$$S: \begin{pmatrix} 1 & 2 & 0 \\ 0 & 1 & 2 \\ 2 & 0 & 1 \end{pmatrix} \to \begin{pmatrix} 0 & 1 & 2 \\ 2 & 0 & 1 \\ 1 & 2 & 0 \end{pmatrix}. \quad (21)$$

and $$S \circ F_1 = \begin{pmatrix} 0 & 1 & 2 \\ 2 & 0 & 1 \\ 1 & 2 & 0 \end{pmatrix} \circ \begin{pmatrix} 5 & 6 & 7 \\ 8 & 9 & 10 \\ 11 & 12 & 13 \end{pmatrix} = \begin{pmatrix} 5 & 6 & 7 \\ 9 & 10 & 8 \\ 13 & 11 & 12 \end{pmatrix}, \quad (22)$$

$$\begin{pmatrix} 7 & 5 & 6 \\ 8 & 9 & 10 \\ 12 & 13 & 11 \end{pmatrix}, \begin{pmatrix} 6 & 7 & 5 \\ 10 & 8 & 9 \\ 11 & 12 & 13 \end{pmatrix} = \begin{pmatrix} 5 & 6 & 7 \\ 9 & 10 & 8 \\ 13 & 11 & 12 \end{pmatrix}.$$

Comparing equations 22 and 18 we see immediately they produce the same result. If one and two are transposed in equations 22 (i.e. swapping their positions in the matrix) we obtain $$S \circ F_1 = \begin{pmatrix} 0 & 2 & 1 \\ 1 & 0 & 2 \\ 2 & 1 & 0 \end{pmatrix} \circ \begin{pmatrix} 5 & 6 & 7 \\ 8 & 9 & 10 \\ 11 & 12 & 13 \end{pmatrix} = \begin{pmatrix} 5 & 6 & 7 \\ 10 & 8 & 9 \\ 12 & 13 & 11 \end{pmatrix}, \quad (23)$$

$$\begin{pmatrix} 6 & 7 & 5 \\ 8 & 9 & 10 \\ 13 & 11 & 12 \end{pmatrix}, \begin{pmatrix} 7 & 5 & 6 \\ 9 & 10 & 8 \\ 11 & 12 & 13 \end{pmatrix} = \begin{pmatrix} 5 & 6 & 7 \\ 10 & 8 & 9 \\ 12 & 13 & 11 \end{pmatrix}.$$

Clearly equation 23 repeats the solution of equation 20. The reason becomes clear on examining the delta shift between rows of the matrix. Clearly, any two relative shifts made between two rows that are the same as a result of the shift vectors will yield the same relationship. The number of unique paired shifts that can be made between any two rows is given by $$n_{shift-pairs} = \frac{1}{2} n_C (n_C - 1). \quad (24)$$

where $n_C$ is the number of columns of the matrix, which are assumed to have unique RAID numbers. This fixes the number of possible solutions since this restricts completely the number of combinations that can occur without repeats.

There is however one other degree of freedom. Since, apart from exact compact situations, the number of rows in the completion matrix (see section 4.2) $F_2$ is always > than the number of rows of splits required to fill each drive in the former step. Consequently, this needs to be taken into account. The reason is that one must find a way of having no common rows between any two shift vectors. However, we may note that swapping rows inverts the difference between two rows: inspecting $S \to \tilde{S}$ in equations 19 and 20 it is easy to see that swapping rows one and three is exactly the same as a 'reflection' or counter-diagonalization.

In some implementations swapping shift vector rows pairwise enables more degrees of freedom. In this case the number of permutations allowed is double that in equation 24. Consequently, equation 25 is likely to hold.

We note in the second step $n_c = Q_D - 1$. Thence an exact solution (probably) exists for cases where $Q_D > R$ if $$2 * \frac{1}{2}(Q_D - 1)(Q_D - 2) \geq (R - 1)(Q_D - 1). \quad (25)$$

Or $$Q_D \geq R + 1$$

The formal proof of a doubling of the solution is as follows. Consider two rows i and j of a vector set $v_j$ and $v_i$ and a third row l $v_l$, and define the difference vector $$\Delta V_{ij} = v_j - v_i; v_i \neq v_j$$

And $$\Delta V_{jl} = v_l - v_j = v_l - v_j + v_i - v_i = (v_l - v_i) - (v_j - v_i); v_l \neq v_j$$

i.e.

$$\Delta V_{jl} = \Delta V_{il} - \Delta V_{ij}; v_l \neq v_j$$

Interchanging the values at locations $v_j$ and $v_i$, we have $$\Delta V'_{ij} = -\Delta V_{ij}$$

and by analogy $$\Delta V'_{jl} = \Delta V'_{il} - \Delta V'_{ij}$$

$$\Delta V'_{jl} = (v'_l - v'_i) - (v'_j - v'_i) = (v'_l - v_j) - (v_l - v_j);$$

$$\Delta V'_{jl} = (v'_l - v'_i) - (v'_j - v'_i) = (v'_l - v'_i) + \Delta V_{ij};$$

For $$\Delta V'_{jl} \neq \Delta V_{jl}$$

Then $$(v'_l - v'_i) + \Delta V_{ij} \neq \Delta V_{il} - \Delta V_{ij}$$

Or $$\Delta V'_{il} = (v'_l - v'_i) \neq \Delta V_{il} - 2\Delta V_{ij}$$

Since we state $$\Delta V_{ij} \neq 0 \text{ for } \forall \{i,j\}$$

Then for any arbitrary value of l $$\Delta V'_{il} \neq \Delta V_{il}$$

Since l is arbitrary, this holds for all rows even if l=j or l=i, provided i≠j. Consequently, swapping pairs of rows should result in a new set of solutions. However, it should be noted that simply shifting all rows in the columns vertically to obtain a second row pattern does not appear to provide a second set of solutions, because 1 is also 'moved'.

Shift Vector and Number Pattern Generation Theorems and Conjectures

It is further clear we require at least two shift vectors to obtain sufficient number of RAID number patterns. I present the following theorem and conjecture:

Theorem

Each shift vector in Step 2 generates ($Q_D$–1) numeric RAID patterns. The minimum and sufficient number of shift vectors to complete Step 1 is (R–1).

Conjecture

Each shift vector with a unique pattern yields at least one solution of unique RAID patterns required to complete at least one row of incomplete drives.

Definition of a Unique Shift Pattern

Every row element in each shift vector is uniquely shifted from every other row and the shift difference is not repeated in any other shift vector, where the shift is always relative to one pattern designated as the original pattern. Any pattern can be designated as an original pattern.

Proof of Theorem.

The theorem is straightforward to prove. The Fulfillment matrix column size is ($Q_D$–1): this is unchanged under a shift operation. Each column represents a single pattern of RAID arrangements required to complete a drive in Step 1. Consequently, each shift vector generates ($Q_D$–1) RAID patterns.

From the fact that each vector generates ($Q_D$–1) RAID patterns, and since the number of patterns required=($Q_D$–1)×(R–1), it follows that the number of shift vectors needed is (R–1).

The conjecture may not be as easily proved since all RAID patterns to complete the drives must be unique arrangements of the RAID numbers. The shift vectors may not be able to ensure the uniqueness requirement and guarantee the unity collision level is always met.

Note that any one pattern can be chosen as the "original" pattern where the element shift is zero for all rows.

Shift Vector Delta Matrix for the Unity Condition

It should be noted that all shift matrix elements in any one row cannot not have the same relative shift (delta) value to any other row in resulting from any other shift vector, otherwise RAID numbers will collide and break the unity condition. Consequently, the full set of the shift matrix column vectors is the set of all combinations which result in different values not only within each element, but must be a unique delta with every other (active) row in the fulfillment matrix Thence $$\beth = \begin{pmatrix} 0 & 1 & 2 & 0 & 2 & 0 & 1 \\ 0 & 0 & 1 & 2 & 0 & 1 & 2 \\ 0 & 2 & 0 & 1 & 1 & 2 & 0 \end{pmatrix}. \qquad 26$$

If we write the delta values between each row element, we note these must be unique. Consequently we can derive the shift matrix delta matrix, which can have values from within the range [–2,–1,0,1,2] due to the limited possible shift values [0,1, 2]

The elements of the delta shift are calculated from:

$$\Delta\beth_{i;2j-1(odd k) \text{ or } \{2j\} evenk)} = S_{ij} - S_{kj}; k \neq i. \qquad 27$$

yielding in our example $$\Delta\beth = \Delta\begin{pmatrix} 0 & 1 & 2 & 0 & 2 & 0 & 1 \\ 0 & 0 & 1 & 2 & 0 & 1 & 2 \\ 0 & 2 & 0 & 1 & 1 & 2 & 0 \end{pmatrix} = \begin{bmatrix} 0 & 1 & 1 & -2 & 2 & -1 & -1 \\ 0 & -1 & 2 & -1 & 1 & -2 & 1 \\ 0 & -1 & -1 & 2 & -2 & 1 & 1 \\ 0 & -2 & 1 & 1 & -1 & -1 & 2 \\ 0 & 1 & -2 & 1 & -1 & 2 & -1 \\ 0 & 2 & -1 & -1 & 1 & 1 & -2 \end{bmatrix}. \qquad 28$$

In theory, no two columns of the top four rows of this delta set should have more than one overlapping value, except in the column of all zero shifts.

The delta set may be useful in generating the shift matrices since the values are constrained by the amount of shift.

General Condition for Unique Shift Vectors

Formerly, for two shift vectors K and L, in order to give unique shifts, for any two arbitrary rows i and j must therefore meet the following conditions $$\{s_{iK}, s_{jK} \epsilon K\}, \{s_{iL}, s_{jL} \epsilon L\} \qquad 29.$$

$$\forall i S_{iK} \neq S_{iL}$$

$$\forall_{i,j;K,L}: S_{iK} - S_{jK} \neq S_{iL} - S_{jL}$$

General Algorithm for Shift Vectors

We require (R–1) vectors to fulfill Step 2 RAIDs, and (R–2) vectors for Step 1 RAIDs. To achieve this, we note (R–1) vectors in the Completion Matrix are the Step 1 RAIDs. Additionally, we require ($Q_D$–1) length vectors for each Step 1 drive to be completed, yet the completion matrix has $Q_D$ rows (RAIDs). The solution is to delete a Step 1 row and shift each of the remaining rows uniquely. This suggests we take the Step 1 and Step 2 RAIDs separately since the $Q_D$–(R–1) Step 2 RAID rows must be shifted (R–1) RAIDs, while the Step 1 RAIDs require (R–2) each. This may simplify the problem if we break the two sets up to form (R–1)×($Q_D$–1) vector sets.

The drive quantity required for an exact solution, per each of the three steps, =1+(R–1)$Q_D$+($Q_D$–1)=RQD. This is a general solution for unity condition of the exact solution.

4 General Analysis of Fulfillment Progression: Fulfillment $F_1$ and Completion Matrices $F_2$ There is a progression at each step of the fulfillment procedure which has a rational mathematical basis. This basis is presented in the following sections.

4.1 Higher Order $Q_D$>R, drive quantity>RQ$_D$

Figure 12:
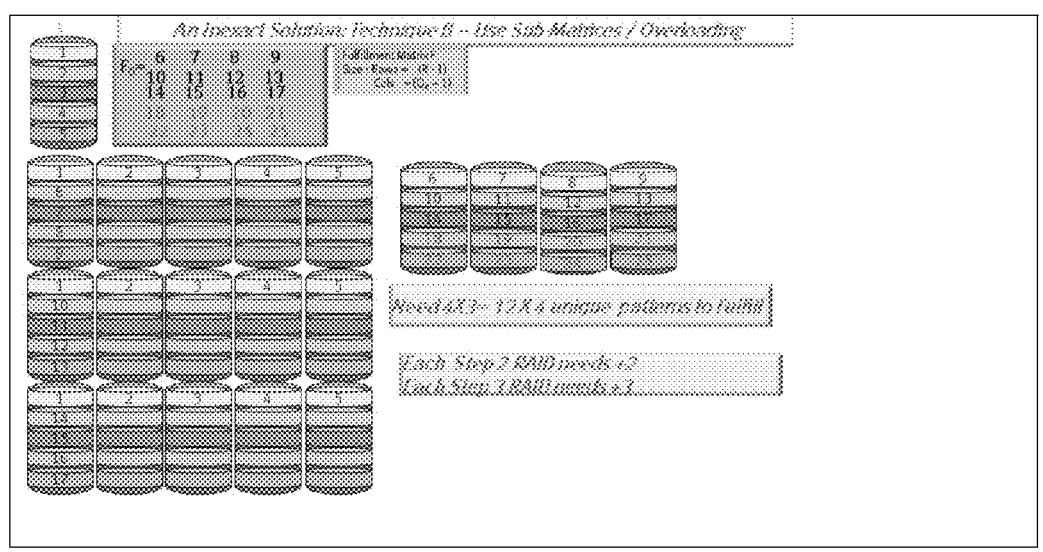
Figure 13:
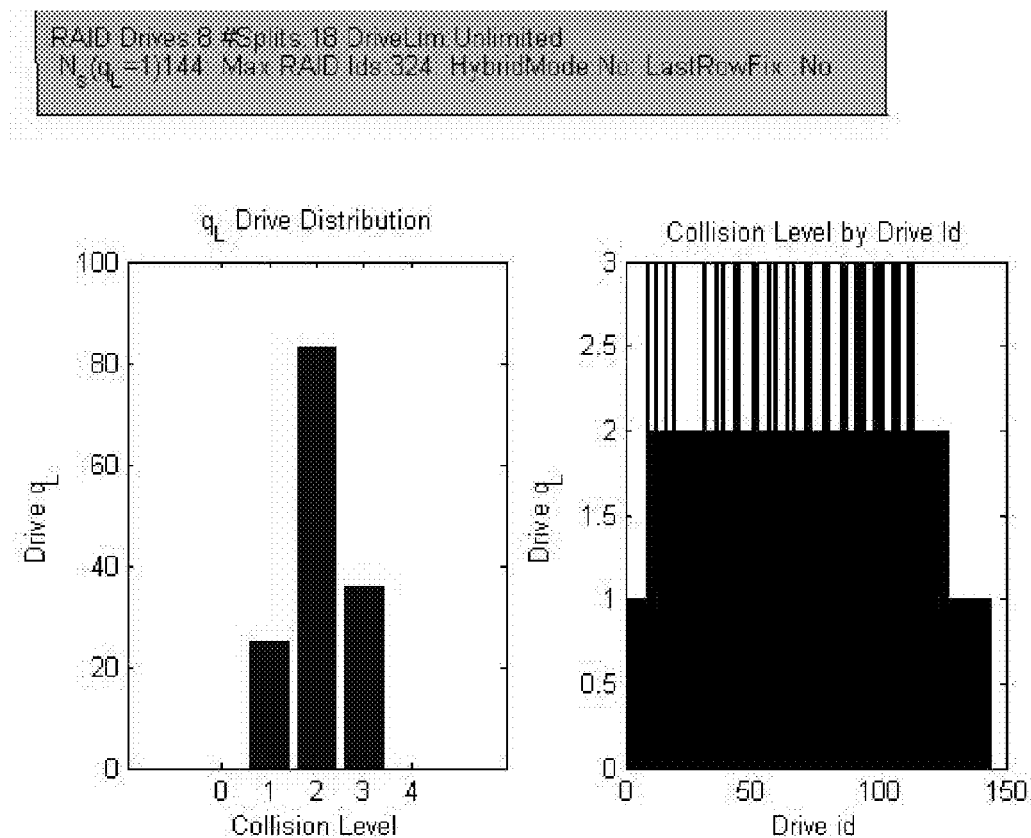

FIG. 12 shows an example in which $Q_D$>R example. In step 2 only the rows 1 . . . R–1 are defined, and rows [$Q_D$–(R–1)] must have additional RAID numbers assigned to complete the new drives, and sufficient drive quantities added. However, the effect is to change the distribution when such methods as heuristic distribution algorithm are used which leads to a break of the unity condition, and may cause a choice between either larger quantities of unused capacity, which is costly and undesirable, and adding RAID groups into the added unassigned splits, which can lead to increased collision levels. Thus paradoxically adding more drives beyond the RQD limit may reduce data reconstruction performance for at least one or members in the RAID Cloud.

Under the condition $Q_D$>R, it becomes clear from the fulfillment matrix that only the (R–1) first set of elements are defined. This is because only (R–1) prior drive sets are predetermined from the previous Step, Step 1. In order to complete the new drives of Step 2, additional RAID numbers must be created to fill the empty splits. To fulfill the new RAID numbers, more drives need to be added to meet any hard rule and RAID fulfillment requirements This may potentially lead to a natural regression which may not be limited unless some terminating principle, such as a forced drive quantity limit and/or RAID Group quantity limit, is imposed.

One may determine that the number of arrangements possible to reach the unity condition is more than one. The number of permutations of the RAID's in Step 3, selected ($Q_D$-1) at a time from $Q_D$ is calculable by noting in equation 9 and definitions 10 we now have $$\frac{N!}{(N-n_S)!n_S!} - n_C \frac{n_R!}{(n_R-n_S)!n_S!} - n_R \geq (R-1)(Q_D-1). \quad 30$$

Where $$n_S = Q_D - 1 \quad 31$$
$$n_R = Q_D$$
$$n_C = Q_D - 1$$
$$N = Q_D(Q_D - 1).$$

Note that R disappears from the LHS of equation 30, and only appears on the right hand side. We obtain:

$$\begin{aligned}\frac{N!}{(N-n_S)!n_S!} - n_C \frac{n_R!}{(n_R-n_S)!n_S!} - n_R &= \frac{[Q_D(Q_D-1)]!}{[Q_D(Q_D-1)-(Q_D-1)]!(Q_D-1)!} - (Q_D-1)\frac{Q_D!}{[Q_D-(Q_D-1)]!(Q_D-1)!} - Q_D \\ &= \frac{[Q_D(Q_D-1)]!}{[(Q_D-1)^2]!(Q_D-1)!} - (Q_D-1)\frac{Q_D!}{[1]!(Q_D-1)!} - Q_D \\ &= \frac{[Q_D(Q_D-1)]!}{[(Q_D-1)^2]!(Q_D-1)!} - (Q_D-1)\frac{Q_D!}{[1]!(Q_D-1)!} - Q_D \\ &= \frac{[(Q_D-1+1)(Q_D-1)]!}{[(Q_D-1)^2]!(Q_D-1)!} - (Q_D-1)\frac{Q_D!}{[1]!(Q_D-1)!} - Q_D \\ &= \frac{[(Q_D-1)^2+(Q_D-1)]!}{[(Q_D-1)^2]!(Q_D-1)!} - (Q_D-1)\frac{Q_D!}{[1]!(Q_D-1)!} - Q_D \\ &= \frac{[(Q_D-1)^2+(Q_D-1)]!}{[(Q_D-1)^2]!(Q_D-1)!} - Q_D(Q_D-1) - Q_D \\ &= \frac{[(Q_D-1)^2+(Q_D-1)]!}{[(Q_D-1)^2]!(Q_D-1)!} - (Q_D-1)^2 \\ &= \frac{[(Q_D-1)^2+(Q_D-1)-1][(Q_D-1)^2+(Q_D-1)-2]\ldots[(Q_D-1)^2-1][(Q_D-1^2)]!}{[(Q_D-1)^2]!(Q_D-1)!} - (Q_D-1)^2 \\ &= \frac{[(Q_D-1)^2+(Q_D-1)-1][(Q_D-1)^2+(Q_D-1)-2]\ldots[(Q_D-1)^2-1]}{(Q_D-1)(Q_D-2)(Q_D-3)\ldots 2.1} - (Q_D-1)^2 \\ &\sim [(Q_D-1)^{2(Q_D-1)}] - (Q_D-1)^2.\end{aligned} \quad 32$$

It is clear that the numerator of the first term is << than the denominator since all the terms for the denominator are included in the numerator, with the additional factor of $(Q_D-1)^2$ in each component, thus giving values of the order of $(Q_D-1)^{2(Q_D-1)}$ for the $(Q_D-1)$ terms in the numerator of 32. The value of the first terms is obviously much larger than the second term, and the conclusion is that for any reasonably value of $Q_D$, condition 30 will always be met. The problem is picking out the best sequences that fulfill all the RAIDs in an easy way and may meet specific requirements as determined from the soft rules. The problem may likely to be NP hard.

4.2 Completion Matrix $F_2$

It can be seen in FIG. 12 that the Fulfillment matrix $F_1$ must be expanded to complete the solution through the addition of RAID numbers to fill the remaining $[Q_D-(R-1)]$ splits in the created drives of the last step. This matrix l have termed the completion matrix $F_2$. In the example of FIG. 12 it is given by:

$$F_2 = \begin{pmatrix} 6 & \ldots & 9 \\ \vdots & \ddots & \vdots \\ 22 & \ldots & 25 \end{pmatrix}. \quad 33$$

the ellipsis indicating the remaining elements of the 5×4 matrix for brevity.

4.3 Other Vectors

It should be noted that the extra rows generated in the Completion Matrix form unique vectors of length $(Q_D-1)$. The number of vectors that are generated by using these rows is $$(Q_D-1)-(R-1)=(Q_D-R)$$

Formerly the set of vectors $V_R$ with $(Q_D-1)$ rows (as required) are generated by the transpose of the negation of the intersection of $F_1$ and $F_0$:

$$V_R = \tilde{F}_R \not\subset F_1 \cap F_0. \quad 34$$

i.e. this is the set of rows of added RAIDs transposed into $(Q_D-R)$ unique vectors.

4.4 RAID Constraints on Shift Vectors

It is clear that each RAID number cannot be added more times than its RAID requires. For example, RAID numbers with RAID5 3+1 cannot be present on more than four drives.

4.4.1 Drive Counting and General Proof of Unity Theorem

It is clear that the following constraints exist for each of the RAIDs added in the Steps:

| Step | RAIDs from Step 0 | RAID from Step 1 Reqmt | RAID from Step 2 Reqmt | Pattern Deficit | Required Number of Vectors |
|---|---|---|---|---|---|
| 0 | R−1 | n/a | n/a | | |
| 1 | Complete | R−1 | n/a | | |
| 2 | Complete | R−2 | R−1 | (R−1) × | Step 1 RAIDs: (R−2) |
|   |          |     |     | ($Q_D$ − 1) | Step 2 RAIDs: (R−1) |
| 3 | Complete | Complete | Complete | 0 | |

Conclusions of this Analysis:
Shifts using Step 1 created RAIDs can only use the number of shift vectors ≤R−2
  Each shift vector produces $(Q_D-1) \Longrightarrow (Q_D-1)*(R-2)$ and can complete: $(Q_D-1)*(R-2)$ drives
Step 2 created RAIDs can only complete (R−1) drives
  There is an excess of Step 2 RAID rows=$(Q_D-(R-1))$
This suggests the net number of RAID sets that can be created (number of drives that can be completed)
  $=(Q_D-1)*(R-2)+\min[\{(Q_D-(R-1)\}, (R-1)]$
  $=Q_D R-2Q_D-R+2+Q_D-R+1=Q_D R-Q_D-2R+3$
Note that the number of drives requiring completion is
  $=(Q_D-1)(R-1)=Q_D R-Q_D-R+1$, and hence to determine if there are sufficient RAID sets to complete all drives in Step 2 we require
  $\min[\{(Q_D-(R-1)\}, (R-1)]=(R-1)$
  $(Q_D R-Q_D-R+1)-(Q_D R-2Q_D+1)=Q_D-R\geq 0$
If $Q_D=R=$Compact Exact Solution
  $\min[\{(Q_D-(R-1)\}, (R-1)]=Q_D-(R-1)$: Implies $Q_D-(R-1)<(R-1)$ or $Q_D$
If $Q_D>R$, more solutions than can be used: Excess RAIDs
Theorem: Necessary (but not Sufficient) Test for the Existence of an Exact Solution
  A Necessary but not sufficient condition for an Exact Solution requires that
  $2(R-1)=Q_D$ or $Q_D \geq R$
  Exact Compact Solution is when $Q_D=R$
  For R=2 (RAID1)—Special Case
The reason for the lack of sufficiency is that all vectors created by the procedures must be shown to meet the collision level unity condition.

4.5 Special Cases

4.5.1.1 Raid 1

RAID 1 is a special case because it requires only one other drive to complete each RAID. Step 2 cannot apply since there is a requirement in Step 1 for just one more drive for each split. In step 2, Step 1 RAIDs would require (R−2) drives to fulfill, which for RAID 1=0. i.e. Step 2 cannot exist for RAID 1. All Solutions can be made as Compact Exact solutions for RAID 1.

In one implementation, exact solutions for RAID1 can be obtained by assigning the transpose of the split assignments of RAIDs on drives in the first fault zone onto the same number of elements in a second fault zone, where in this representation the columns represent drives and the rows are splits on each drive, In a second implementation a compact exact solution can be used, and the following table provides the statistics and calculations for RAID1 systems that ensures $c_L=1$ in the compact exact case.

| Parameter | Equation | Comment |
|---|---|---|
| Drive Spread | $1 + Q_D$ | Sequentially complete by transposing row vector needed to complete current drive into subsequent (needed) drives (represented by column vectors). Each transpose step reduces the number of unassigned splits by one. In the subsequent 'created' columns (drives) required to fulfill additional RAIDs filling the unassigned splits of the drives.. |
| RAID Hyper Count | $Q_D (1 + Q_D)/2$ | |
| Total Splits | $Q_D (1 + Q_D)$ | |
| Unassigned Splits | None | |
| Split Utilization | 100% always | |

4.6 Row Shift Algorithms

In one implementation the first or a chosen row is left unshifted, and the modulo set to the number of columns (elements along the row i) (in this implementation, the modulo $L_0=(Q_D-1)$ is used, but any appropriate modulo may be used) such that the column index obeys $$h_{R\text{-}shifted}=1+\text{modulo}[(h+\text{shift}-1)/L_0]; \{i=(1 \ldots (Q_D-1)\}; \quad 35.$$

This is a right shift which wraps around the end of the column. A left shift can be used for another implementation and is done using:

$$h_{L\text{-}shifted}=L_0-\text{modulo}[(h+\text{shift}-1)/L_0]; \{i=(1 \ldots (Q_D-1)\}; \quad 36.$$

The calculation of the shift 'shift', an integer of any value, is provided by an additional algorithm in the following sections. The shift in this part of the document always refers to a shift from the original order of the completion matrix.

In yet another implementation, both left and right shift may be used in combination, such as alternately on even and odd rows, or other combination.

4.6.1 Shift Algorithm

A partial solution that gives reasonable results for R=8 or less is to consider for each vector J=[1 . . . (R−1)], the ith split (row) where i=(1 . . . $Q_D$−1) provides a shift given by:

$$\text{shift}=(i-1)*(J+k_{i,J})+(J+k'_{i,J}) \quad 37.$$

This shift is applied across the entire row (i.e. for each column element which is shifted by the same amount in the row). New column indices are calculated using one or both of the equations 3435 and 36 in some order e.g. equations 34, 35 for odd rows and 36 for even rows. Where $k_{i,J}$ and $k'_{i,J}$ are shift parameters, and normally we set the k's=0: this may be changed to obtain better results.

The issues with this method are the following:
a) Order of the elements in a row (the column vector) is always maintained
b) At some point two rows will have the same shift as the shift is made of two values such that shift(row i)=shift (row j). In this instance RAID collisions will occur and at least one of the general conditions expressed in equation 29 is violated.

a) can be partially overcome if we consider multiples that are $\gg(Q_D-1)$, preferably or probably are prime numbers. In doing so numbers in adjacent the columns may be shifted pseudo-randomly in the modulo arithmetic, in order to 'jumble' the orders.

4.6.2 Increasing Degrees of Freedom Through Order Breaking

It has been determined that shift vectors may not meet the unity condition. This is because the shift vectors maintain the order of RAIDs along the rows and it may not be sufficient to retain this order to meet the unity condition. Even and odd numbers of RAIDs (even or odd ($Q_D$−1)) also mean, the way in which columns are interchanged is different, as odd values do not 'pair' on interchange, and at least one row cannot be interchanged: thus there is always an additional step in dealing with odd numbers of RAIDs being interchanged.

An alternative to systematic interchangeability is simply a heuristic approach. This is the approach adopted in the algorithm "FixLastRows2".

When $[k_{i,J} k'_{i,J}]=0$ for all i,J. the last and second from last row may not be optimally arranged. In one implementation the algorithm may be implemented to reduce collisions through the reordering of RAIDs in the last two rows of Step 3:

[Out_F2]=FixLastRows2(In_F2,BaseRAIDNum,
  N_modulo, . . . shiftcols,KeepOnNoSolution)

where In_F2 is the input F2 matrix containing the last two row assignments at least, BaseRAIDNum is the lowest RAID number in the set of RAIDs in the Cloud or the minimum value from which any new RAID device is to be created. N_Modulo is the modulus number for the original shift vector, shiftcols is the set of columns to be shifted. KeepOnNoSolution keeps local optimizations solutions even if the unity condition cannot be met.

The algorithm functions as follows:
1. Each of the last two row elements from the completion matrix reserves the set of RAIDs with which it has 'collided' in the SaveSet{RAID_idx} reference set.
2. In each new vector set, the rows are initially shifted or rearranged
3. FixLastRows2 algorithm is called.
4. The last rows are taken in turn; each RAID id in the selected row is moved into the column where the minimal number of collides (preferably 0 excluding itself) occurs. The 'collision set' SaveSet is updated for the RAID when placed. RAIDs are taken in the order of the input matrix and no attempt is made to optimize before placement: for example, there may be two or more columns with '0' collisions for a RAID but the first such column is chosen.
5. If it is demanded that the RAID is placed irrespective of the fact that it does not meet the collision level requirement, the RAID is entered if (KeepOnNoSolution=true). Otherwise, a null RAID value is set in the column/split value and the RAID may not be fulfilled: this may be found to occur to an entire row under strict $q_L$=1 conditions. The RAID group may then be eliminated from the RAID Cloud or partitioned into a smaller RAID set or other erasure code, and the remaining splits may remain unassigned and used as spare splits.
6. The process is repeated for all subsequent shift vectors, with the SaveSets retaining all the accumulated prior collisions for each RAID.

4.6.3 Search Algorithms

In some implementations the following common heuristic 'tree' algorithm may be used.
1. Keeping first Row values in place, select the next row and attempt placements to ensure $q_L$=1 ("the unity condition" in our case we use the SaveSets to retain prior RAID collisions for future comparisons)
2. Continue and complete the Row. If any one of the row elements cannot meet the unity condition, return to start (top of tree for the row), apply a shift vector or rearrange the row randomly and repeat the algorithm for a new solution with a different sequence in the row. Store the collision level in each. sequence
3. Repeat for each subsequent row, and return to the prior node in the tree each time the unity condition is broken. If the node is repeatedly tried, move to the next highest node. This may lead back to the start, thence re-sequence the start row.
4. Continue until the unity condition is met, or until a set number of iterations has been tried, or a computational time limit is reached, and select the best (optimal) solution from the derived set of solutions.

There is a likelihood that such a procedure may not find a solution within a computationally reasonable time. The last step is the intent to accept a sub-optimal solution within a computationally acceptable time. The following section formalizes the approach.

4.6.3.1 Formulation into a Binary Integer Minimization Tree Problem

Consider a RAID id number designated by its original ith column and kth row position in the original completion matrix, and that its placement in the J−1 set is represented by $a_{ik;J-1}$. After generating J−1 vectors, it will have accumulated a set of read collisions which will be designated by the use of curly brackets $\{a_{iK;J-1}\}$. The sets of collisions are cumulative from each prior vector<J for each RAID id $a_{ik;J-1}$ to ensure that the next vector has a unique arrangement of RAID ids. Additionally, let the count of intersections between any two elements be represented by square brackets.

The minimization problem can then be stated as the minimization of the number of intersections of the collision sets with already existing elements in any column l with populated rows m<k:

$$\min\left[\sum_{k=2}^{Q_D-1}\sum_{i=1}^{Q_D-1}\sum_{m=1}^{Q_D-1}[\{a_{ik;(J-1)}\}\cap\{C_{(m<k)l;J}\}]\right]. \qquad 38$$

If we include the unity condition, then $$\min\left[\frac{\sum_{k=2}^{Q_D-1}\sum_{i=1}^{Q_D-1}\sum_{m=3}^{Q_D-1}[\{a_{ik;(J-1)}\}\cap\{c_{[(k-1)<k]l;J}\}]}{(Q_D-2)(Q_D-1)}-1\right]; \qquad 39$$

$$k\neq J; k\in[1\ \ldots\ Q_D].$$

as there are $(Q_D-2)(Q_D-1)$ comparisons that should be unity in one vector set J (minus 2 as the intersection comparison starts with the second row versus the first row—thus there are $(Q_D-2)$ comparisons in each column, and $(Q_D-1)$ columns. The sum of these comparisons with desired collision level of unity should then be $(Q_D-2)(Q_D-1)$ and the target minimum would be zero in equation 39).

where we assume the Jth row is missing to remove one row of Step 1 created RAIDs for each vector set. The column of numbers above the kth position being inserted in column l:

$$C_{(1:k-1)l;J}=\bigcup\begin{array}{l}k-1\\X=(1\ \ldots\ k-1;\neq J); y\in[1\ \ldots\ Q_D-1]\end{array}\langle a_{xy;J}\in l\rangle. \qquad 40$$

4.7 Note on the Extension to all Cases [$Q_D$, R'<R]

Note that if the solution is found for a [$Q_D$, R] combination, in effect one has also solved for all R'<R. The number of vectors is 'chopped' at R'-1, since there will also be a reduction in Step 1 drives to (R'-1) sets. $Q_D$ remains the same and is independent of R'.

4.8 Constrained Parameter Algorithms for Split Allocation

Constraints will be forced on any distribution algorithm due to physical limitations within a system and from customer requirements. Additionally, algorithms must also attempt to accommodate sparing requirements and upgrade paths as customers add (or even subtract) from a common pool of drives in the Cloud spread. The BOBU (Back-Off/Build Up) algorithm is intended to assist in the objective of performing such mappings from the ideal unconstrained environment attempting to fulfill the unity condition, to the real world constraint-dominated environment, through a systematic process.

4.8.1 Back-Off/Build Up Algorithm ("BOBU")

Figure 15:
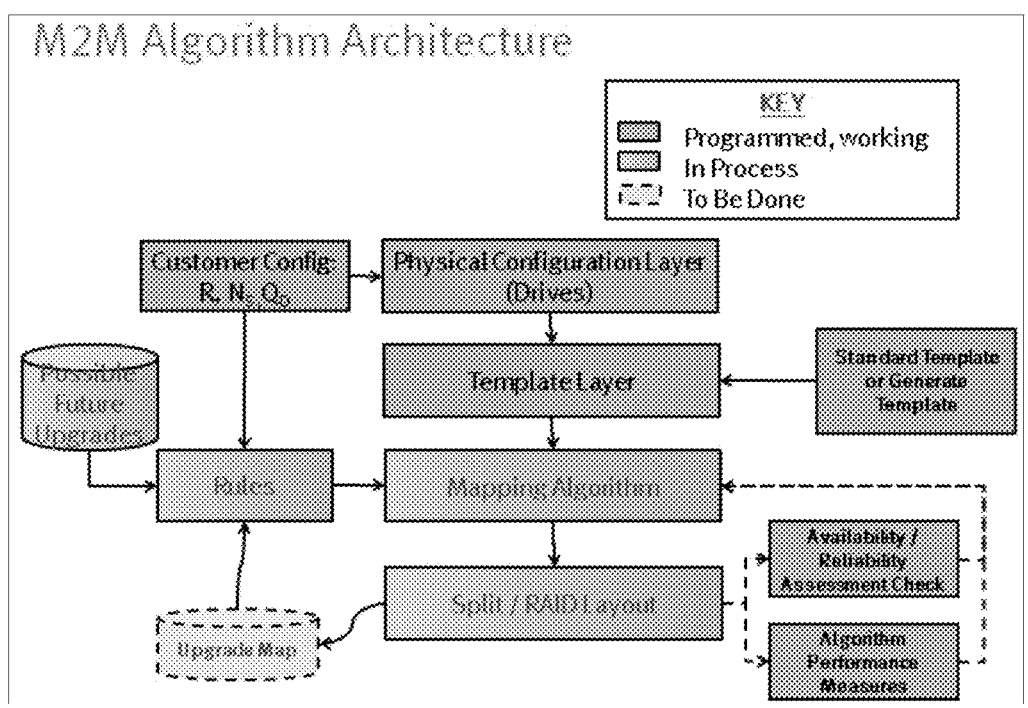

FIG. 15 shows an example of the Back-off/Build-up (BOBU) Algorithm Top Level Architecture. The strategy of BOBU is as follows:

In this implementation templates are created with optimal split distribution regardless of drive quantity constraints
  Allows for future improvements to distribution algorithms
  Inputs: R, acceptable rebuild time or split size (if fixed), number and type of drives. Q may be determined or assigned to enable these values through using a distribution method and varying said parameters to meet the rebuild requirement.
  From the template, drives are removed from ideal number down to the drive requirement, removing RAID Identities in a progressive systematic manner. This creates unassigned and spare splits and may allow for future upgrades with minimum restructuring when drives are added.
Map to limited drives (First Constraint), or determine minimum drives
  In some implementations, different strategies may be used to reduce drive quantities to fit within a given network based storage solution:
    In one implementation the method reduces the number of RAID 'sets' to fit in new drive quantity:
      This may create 'unassigned' splits which may then be reassigned as
        'unassigned' splits
        create new RAID type to utilize said at least one unassigned split,
        Assign as a spare split,
        Assign as a reserve split
    In yet another implementation the unassigned splits may be reused to further minimize collision levels and mean collision level and max collision levels
    In another implementation various other RAID types or erasure codes compliant to the number of unassigned splits may be assigned
    In another implementation the number and size of splits may be varied wherein splits may be further divided and combined
    In another implementation, said unassigned splits may be interchange assignments with RAID and spare splits to further optimize when configurations may change due to addition or removal of drives into the cloud.
    In yet another implementation, the unassigned splits may be used to optimize the distribution for reliability and availability purposes as part of the soft rule optimization procedure.

4.8.2 BOBU Back Off Example

Figure 16:
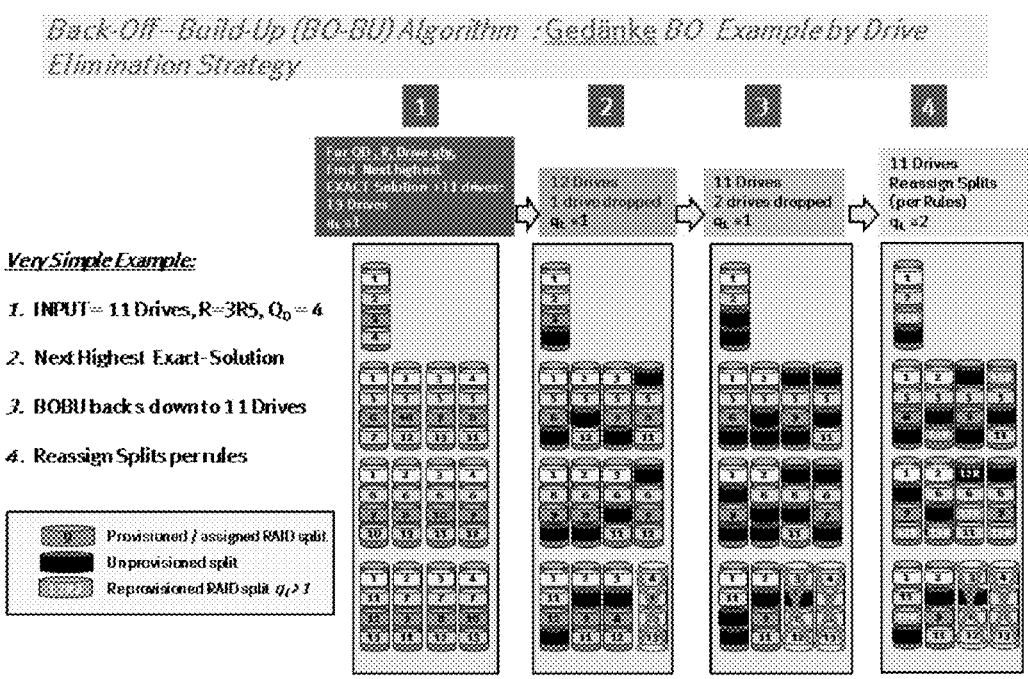
Figure 17:
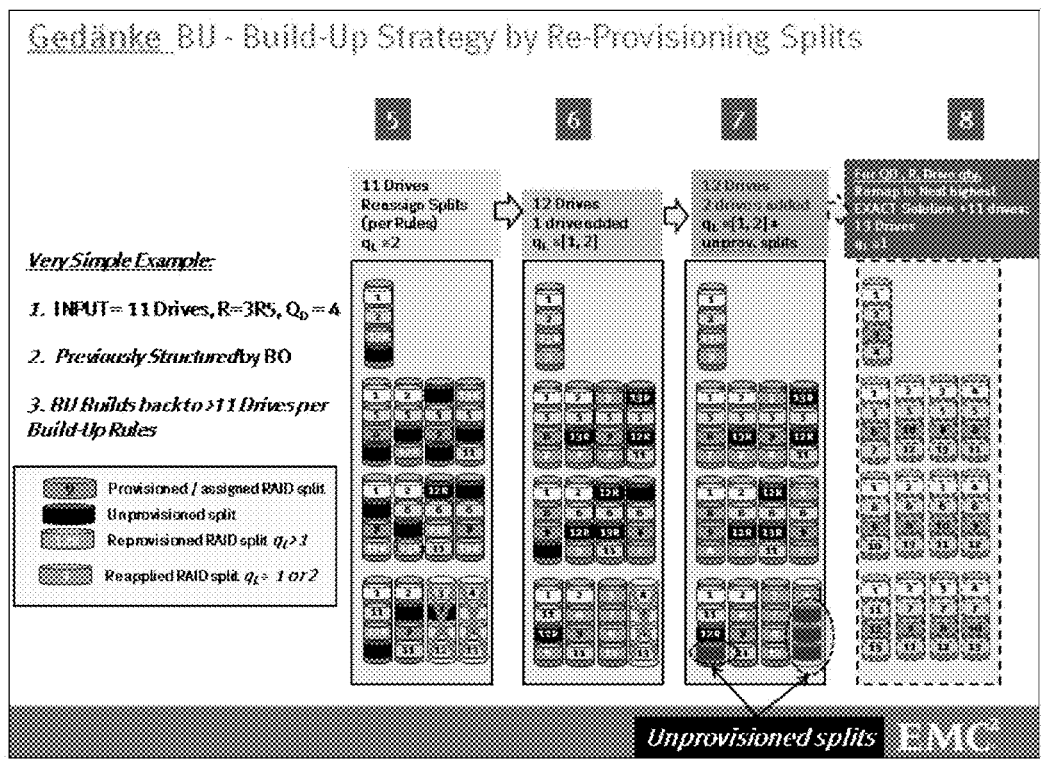

In the example shown in FIGS. 16-17, a Compact Exact solution template layout is remapped down from 13 drives to 11 by the Back-Off algorithm resulting in spare splits and a reduced set of RAID identities. FIG. 16 shows a back off example, and FIG. 17 shows a build-up example.

4.8.3 BOBU Algorithm Flow Diagram

Figure 18:
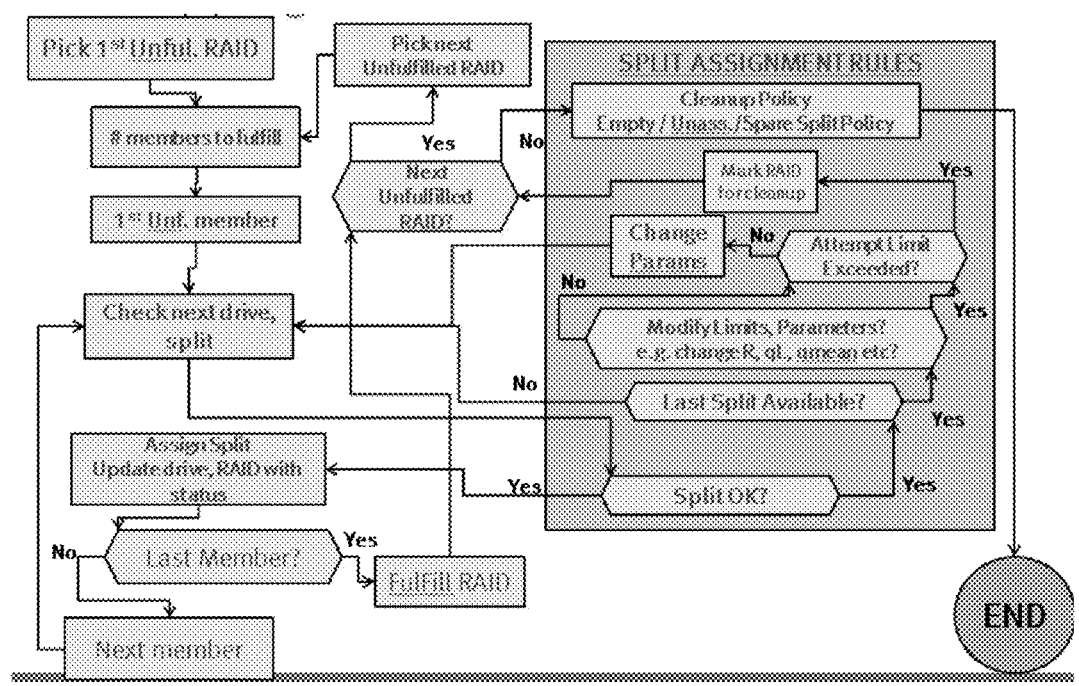
Figure 19:
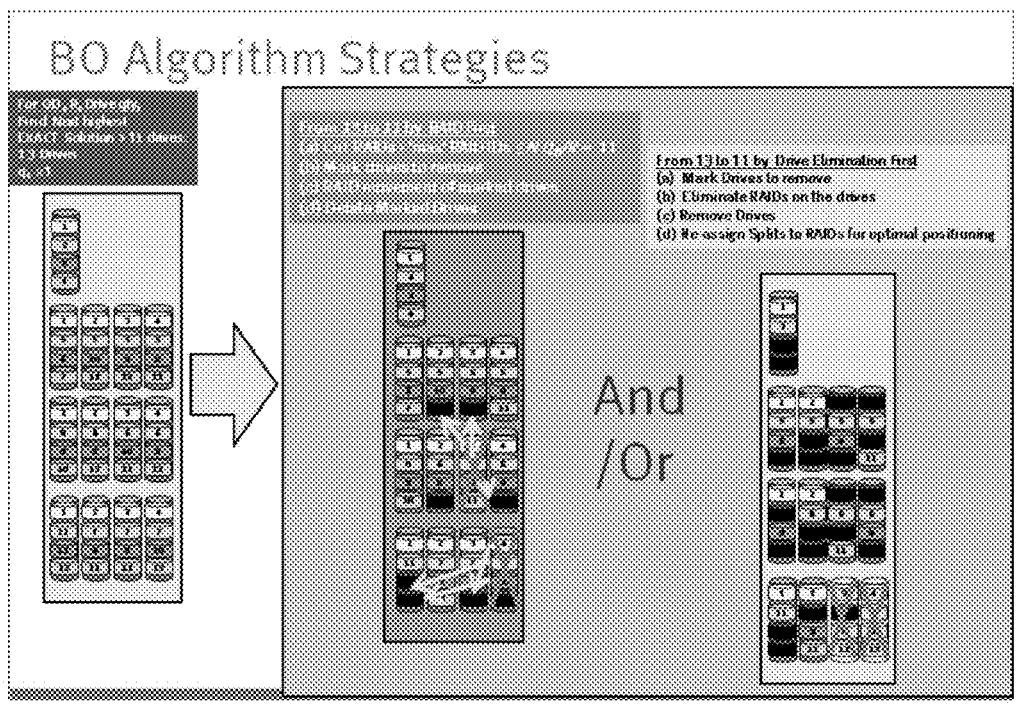

FIG. 18 shows a BOBU Split Assignment Flow Diagram, and FIG. 19 shows BOBU Back-Off strategies by (a) RAID ID elimination or by (b) Drive Elimination procedures

4.8.4 BOBU Drive Failure Management

In the event of a drive failure, the failed drive is assumed made not ready (not accessible by a host) and the following sequence is executed (high level)
  1. Read Sources are identified (the "Read Spread")
  2. Write Targets are identified per rules and ranking (the "Write Spread")
  3. Rebuild procedure follows many-to many read/write

4.8.4.1 BOBU Business Rules

FIG. 20 shows an example set of BOBU Split RAID Identifier Assignment Rules. Not all the rules in FIG. 20 need to be applied in a given implementation. Rules are regarded as entities with specific properties in the algorithm. These include but not limited to
  Rule Properties Include
    Must be met (true/false)—this is a hard rule
    May be degraded (true/false)—this is a soft rule
    Degrade by attempt function—custom function dependent soft rule or 'hook' by external function
    Utility function (parameter value translated into a 'desirability' score by a custom function)
    Weight assignment (relative importance or rank value with respect to other rules)
    Cleanup policy (if can't assign, then resort to 'best of worst' or other defined policy as may be determined for the application)

4.8.4.2 Write Target Selection and Considerations

Figure 21:
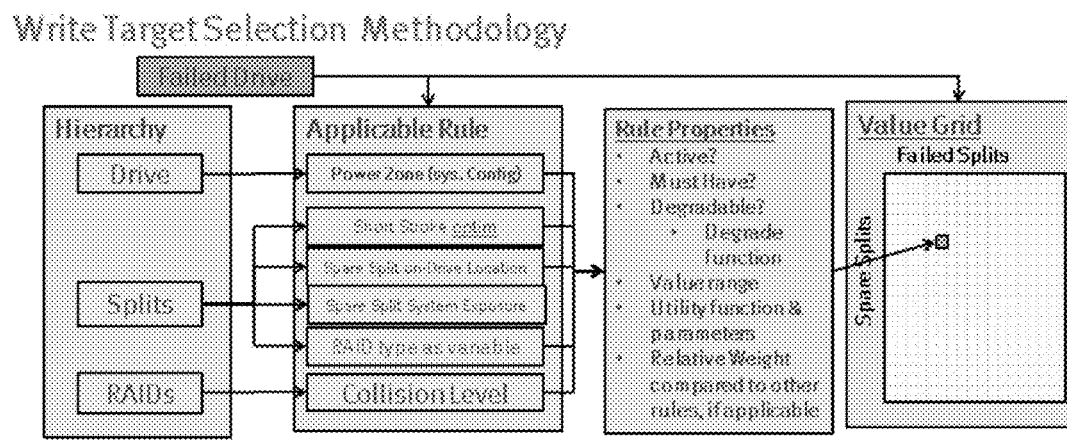

FIG. 21 shows an example BOBU Failed Drive Write Target Selection Methodology
  Write targets are spare splits on drives which (generally) meet the sparing rules unless desperate
  Spare splits are ranked by a ranking algorithm.
    Ranking algorithm calculates the rank value to optimize the selection
  Considerations:
    DAE rule restrictions (behind one engine)
    Power zones (hardware fault zones)
    No two spare splits may be chosen for any one RAID Group on any one drive. In some implementations this may be relaxed in desperation placement scenarios
    Some implementations may include the means to maximize the number of write drives without breaking rules
In some implementations where splits to write exceed the number of available write drives multiple splits on one or more drives may be used resulting in Write collisions
  In some implementations, the choice of spare splits may cause relaxation of fault zone rules
  In some implementations, multiple soft rules may be relaxed
  In some implementations hard rules may be allowed to be broken during "desperation" placement procedures.
  One Technique to rank and evaluate the desirability of a split as a write target is through the use of a scoring technique to create a ranking. One approach is the use of multicriteria decision analysis (MCDA) described below.

4.8.4.3 BOBU Write Target Ranking By Multicriteria Decision Analysis (MCDA) Approach In some implementations, multiple Rules are determined wherein
  Each rule is an object
  Each rule provides a value for each spare split selection (potential target split) relative to each RAID member (source split) present on a failed drive for each rule
In some implementations, said values for each target/spare is assessed by means which may include but not limited to the addition of all said values.
In some implementations a hash algorithm may be used to pick the best group of spare splits wherein the hash method may group target spare sets to determine an overall score of the group, and said deemed best score group may be selected as the source-target solution.

Figure 22:
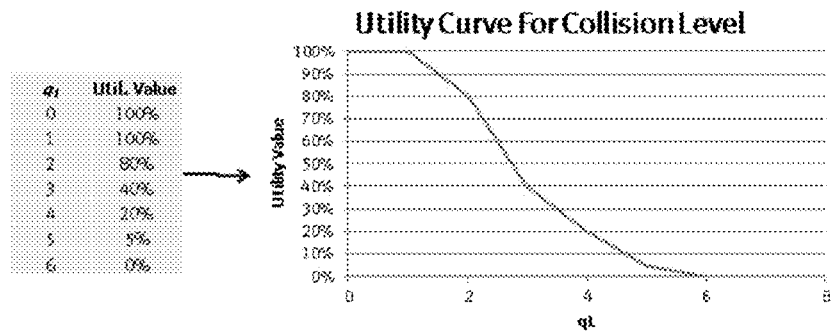

FIG. 22 shows an example MCDA Example of Utility function.

5. Rebuilding, Restoring and RAID Collisions

In the event of a disk failure, sufficient spare splits have been set aside such that the lost data of the failed drive may be rebuilt by parallel writes to other physical volumes. Generally, the bandwidth of the switching network, measured in GB/s, far outstrips by at least an order of magnitude the read and write speed from/to physical volumes, of which the latter's peak read/write is of order 200 MB/s. In theory, parallel read and write should lead to a potential speedup of data rebuild by an order of magnitude as may be determined from this patent or other means Partitioning It is possible to partition the storage devices of a given distributed network of storage elements. For example, as shown in FIG. 23, example 1, assume that the distributed network of storage elements has six zones—Zones 1 through 6—and that there is an uneven distribution of available storage elements (QTY) in the zones. In the example shown in FIG. 23 zone 1 has 5 storage elements, zone 2 has 7 storage elements, zone 3 has 8 storage elements, zone 4 has 16 storage elements, zone 5 has 12 storage elements, and zone 6 has 4 storage elements. If the distributed network of storage elements is to be optimized for placement of redundancy using a RAID 3+1 scheme (4 drives per RAID), the distributed network of storage elements may be partitioned to logically group storage elements from four fault zones in which the RAIDs may be distributed.

For example, in FIG. 23, Example 1, partition 1 has allocated 4 storage devices from each of zones 2, 3, 4, and 6. By allocating 4 storage devices from each of the four fault zones, RAID protected groups will obey the hard rules described above, while minimizing the number of excess storage devices within the partition.

FIG. 23, example 2, shows another example in which there are three fault zones, and each of the fault zones has 6 storage devices. The RAID scheme to be implemented in this example is 1+1—data mirroring. In this type of RAID scheme, pairs of storage devices are allocated to store the data. Accordingly, each of the partitions includes storage devices from two fault zones. As shown in these examples, in some implementations each partition may have storage devices allocated from a number of fault zones which is larger than or equal to the number of fault zones required by the largest RAID group to be stored in the partition. This guarantees that the partition will be able to support the largest RAID group without violating the hard rule against having multiple splits from a RAID group allocated out of the same fault zone.

In one embodiment, RAID groups do not cross partitions. In another embodiment RAID groups are allowed to cross partitions, such that splits of a given RAID group are stored within storage devices allocated to different partitions.

The following Table shows an example storage system with eight fault zones, which have been partitioned into four partitions. The partitions are grouped into group A (partitions 1 and 2) and group B (partitions 3 and 4):

|       | 1 | 2  | 3  | 4  | 5 | 6 | 7 | 8  |
|-------|---|----|----|----|---|---|---|----|
| Total | 8 | 16 | 12 | 13 | 5 | 9 | 8 | 12 |
| P1    | 0 | 6  | 6  | 6  | 0 | 0 | 0 | 6  |
| P2    | 4 | 4  | 0  | 0  | 0 | 4 | 4 | 0  |
| P3    | 0 | 6  | 6  | 6  | 0 | 0 | 0 | 6  |
| P4    | 4 | 0  | 0  | 0  | 4 | 4 | 4 | 0  |
| Spare | 0 | 0  | 0  | 1  | 1 | 1 | 0 | 0  |

In this embodiment, a given RAID group may be formed by selecting splits from storage devices allocated to multiple partitions. For example, a RAID could be formed by selecting one device from partition 2 fault zone 2 and another device from partition 4, fault zone 5. It may therefore be possible for storage devices to be paired across fault zones to form RAID sets. In some embodiments this maximizes the use of spare device capacity and assists in distributing RAID splits over a maximum number of fault zones.

Figure 24:
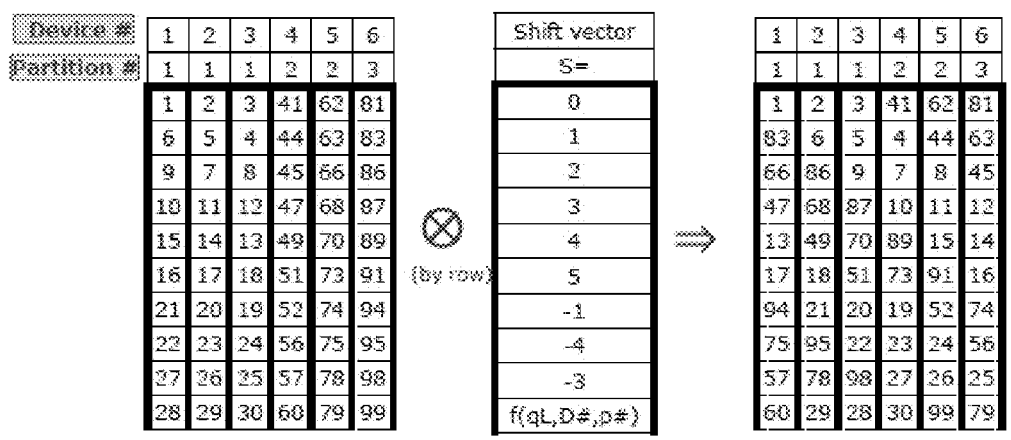

FIG. 24 shows an example of mixing of splits of a set of storage devices which have been allocated to different partitions. In the example shown in FIG. 24, the mixing has been implemented using a shift vector S. In the example shown in FIG. 24, there are six devices in three partitions. Devices 1, 2, and 3, are in a first partition, devices 4 and 5 form a second partition, and device 6 is a third partition. The shift vector is applied on a row-by-row basis to shift the splits of the devices between partitions. For example, the first row is shifted 0 positions, the second row is shifted 1 position, etc. The end result is shown in the matrix on the right.

By shifting rows in this manner, splits supporting RAID groups within a partition may be mapped to different storage devices within the fault zone. By shifting spits of a partition between multiple devices within the fault zone, failure of a given device will be distributed to each of the partitions rather than being concentrated within a partition. This allows simultaneous recovery of the data stored on splits of the failed device in multiple partitions simultaneously. By contrast, without performing the split shift shown in FIG. 4, failure of a given storage device would only affect one of the partitions to thus require the one partition to recover all data stored on the failed storage device.

The shift vectors shown in the example of FIG. 24 provide a particular example. The actual implementation may use other shift vectors or other ways or more than one way to affect the distribution in any one zone. In an embodiment, each shift vector may be determined by an optimizing function f(qL, D#,p#) or another algorithm as indicated in the last entry of the shift vector, which may interchange column elements. In FIG. 24, qL is the collision level which may be calculated from RAID collisions across each partition.

Erasure Codes

Erasure codes are forward error correction codes which transform a message of k symbols into a longer message code word with m symbols (m=k+r) such that the original message can be recovered from a subset (any k) of them symbols. FIG. 25 shows an example of an erasure code. In the example shown in FIG. 25, the data block size is 4096 bytes. The Canary word is a hash of the data in the data block with a hash key. The Canary word length $W_L$ was set to 16, which also corresponds to the length of the hash key $W_K$. The Gaulois field word length value $G_W$ for this erasure code was selected at 4 providing the word length $W_L$ of 16 bytes. The dispersal k for this erasure code was selected to be 10, meaning that the encoded data will be dispersed over 10 nodes and be recoverable from any set of 10 nodes. The redundancy level r was set to 2, hence the total number of splits Ri required to implement this erasure code would be 12: #splits=k+r. The data stored in the erasure code may be recoverable by reading data from any k (e.g. 10) of the Ri (e.g. 12) storage locations.

Although an example erasure code is provided in FIG. 25, which has some assumed parameters to enable an implementation to be explained, many erasure codes may be created. Specifically, the data block size D, the Gaulois Field Word Length value $G_W$, the Canary Word Length $W_L$, (note that in other erasure codes the Canary may not exist or be included in the data block) the number of dispersal nodes k, and the drive level redundancy r, may all be changed to specify different types of erasure codes. The term "erasure code" as used herein is not limited to the particular example shown in FIG. 25.

To implement an erasure code in a storage system having a large number of devices, splits will be allocated to store the data in the storage system. The allocation of splits to the erasure code must follow the hard rules described above. However, since the data may be recovered from any set of k drives, up to r splits may be contained in any given fault zone. Specifically, since the data for the erasure code will be split between Ri=k+r splits, and only k splits are required to recreate the data, up to r splits may be allocated to any given fault zone. Storage of an erasure code is not, therefore limited to a hard rule of having no more than 1 split per fault zone, unless the redundancy value of the erasure code is selected such that r=1.

As described above, a given set of storage devices may be partitioned into groups such that a particular partition has storage devices allocated from fault zones that will guarantee the ability to allocate splits to RAID groups up to a predetermined size. Likewise, even where the storage system is not partitioned, a mapping may be created that is optimized for placement of data in RAID groups up to a predetermined size, e.g. to optimize placement of RAID groups using a standard RAID level. As used herein, the span R of a distributed network of storage elements will be used to describe the number of splits contained in RAID groups within a mapping that is created for the distributed network of storage elements. The span R may be specific to each partition, although this is not necessarily the case. For example, the storage system may implement a mapping using a span of 8: R=8 splits, such that RAID groups requiring up to 8 splits may be mapped into the system and comply with the hard rule that only one split per RAID group occupy any given fault zone.

An erasure code, unlike a standard RAID group, may use any arbitrary number of devices as the dispersal is not as tightly constrained as it is in conventional RAID storage schemes. Likewise the redundancy may also be more arbitrarily assigned in an erasure code hence relaxing the requirement that no more than one split per erasure code group occupy a given fault zone.

Where the span Ri (Ri=k+r) of the erasure code group is larger than the span R implemented in the distributed network of storage elements, multiple RAID groups of the distributed network of storage elements may be combined together to obtain the required number of splits for the erasure code group. Likewise, where the span Ri of the erasure code is smaller than the span R implemented in the storage system, the Ri splits of the erasure code group may be combined with another storage volume (e.g. with a splits of a second erasure code group) such that splits of more than one erasure code group or splits of an erasure code group and splits of a RAID group may collectively occupy a given RAID group of the storage system.

The term "composition" will be used herein to refer to a situation where two or more RAID groups or parts of RAID groups are required to be combined to obtain the redundancy level Ri of the erasure code. Composition occurs where the span R of the distributed network of storage elements is smaller than the intended span Ri of the erasure code. In composition, RAID members of each RAID group included in the composition are selected to be disjoint with respect to storage device location, i.e. R{i} ∩R{j}=0 if i≠j for any two RAID groups identified by i and j. And, no more members than the redundancy level will be allocated to any fault zone. All other hard rules are upheld.

The term "decomposition" is used herein to refer to a situation where the span R of a given RAID group of the storage system is larger than the span Ri of the data to be stored in the RAID group. In this situation a given RAID group may be shared by multiple sets of Ri, where R>Ri.

When an erasure code is to be implemented on a given storage system, it is possible to do a remapping of the splits of the storage system based on the Ri associated with the erasure code. Thus, in the example erasure code described above in which Ri=12, assume that a storage system has implemented a mapping based on an R=6. It would be possible to re-map the storage system to change the mapping of the storage system from R=6 to R=12 and directly map the splits of the Ri=12 erasure code into the storage system. Alternatively, composition may be used to select two storage device disjoint RAID groups from the storage system to implement the required 12 splits rather than remapping the splits of the storage system. Likewise, if the storage system were previously mapped using R=4, using composition a group of 3 disjoint RAID groups may be selected to implement the required 12 splits for the Ri=12 erasure code without requiring the splits of the storage system to be remapped.

Figure 26:
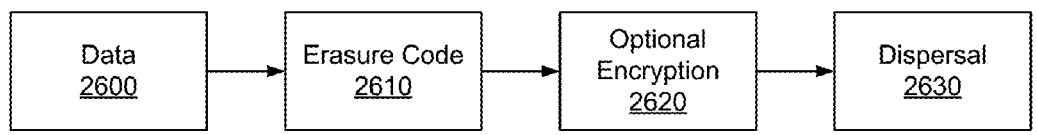

FIG. 26 shows an example process of erasure code dispersal into a storage system implemented using a distributed network of storage elements. As shown in FIG. 26, data 2600 is used to create an erasure code 2610. The data is then optionally encrypted 2620 and dispersed into the distributed network of storage elements 2630. The composition and decomposition processes described above are part of dispersal process 2630.

Figure 27:
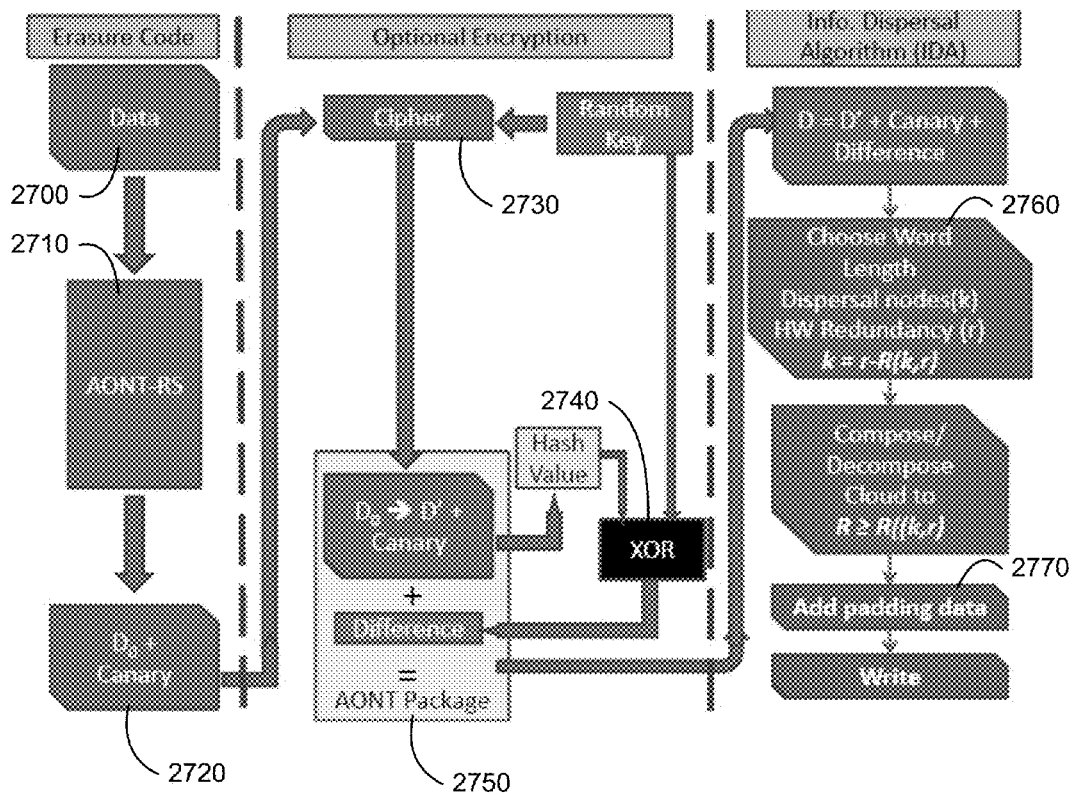

FIG. 27 shows the process of FIG. 26 in greater detail. In the example shown in FIG. 27, a fixed data block size 2700 is fed to an All or Nothing Transform with Reed-Solomon (AONT-RS) coding process 2710. The fixed data block size has a Gaulois Field $2^{GD}$ in length and is divided into words each of length $2^{GW}$ where $G_W<G_D$. The Canary word is then added 2720. The Canary contains a hash value generated from all the data words using a random key K of the same length as the Canary word.

Each ith word generates a codeword Ci=XOR{data(i), E(K, i+1)} 2730. E is an encoding scheme such as a Reed-Solomon code. The "Difference" word is calculated 2740 as an XOR{K, hash value} and added to the data 2750.

The data is then dispersed into a distributed network of storage elements. In one implementation, the word length is based on the number of dispersal nodes k and the hardware redundancy R 2760. For example, the Codewords may be determined as systematic to k (the dispersal factor) to reduce computational load, but in some encoding schemes they may be made unsystematic. Pad bytes are added to make the word lengths equally divisible among the k nodes 2770.

m>k nodes are selected to give hardware redundancy, where the redundancy r=m-k. In certain implementations m=R, where R is the number of splits in a RAID group for which a mapping has been created in the distributed network of storage elements. Typical RAIDs may include RAID 6 (6+2), RAID 5 (3+1) and RAID 1, among others. When m=R, composition and decomposition is not required as the words of the erasure code may be directly mapped to a given RAID group within the distributed network of storage elements.

If m>R, two or more RAID groups from the distributed network of storage element will be composed to obtain a set of splits for storage of the code words. If m<R, then R may be decomposed into at least two sets of erasure code—generated data sets, wherein the sum of the several data sets is equal to m: m=nR, where n typically is an integer.

A RAID cloud may in some instances be configured so as to utilize one or more specific erasure codes, and the effective R is then determined by the parameters of the erasure algorithm (or vice-versa).

In an implementation, different partitions are created to contain storage devices in different numbers of fault zones. For example, a first partition may be formed using storage devices in 4 fault zones and another partition may be formed using storage devices in 8 fault zones. In this example, an erasure code with Ri=r+m=12 is to be stored, a first RAID group in the first partition may be composed with a second RAID group in the second partition to obtain splits dispersed over at least 10 of the fault zones. By providing partitions with different spans, optimal placement of an arbitrary length erasure code may be achieved by selecting RAID groups within separate partitions and composing a set of RAID groups to achieve m splits by composing across partitions.

Implementations of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. In addition, the instructions may be implemented in a high-level procedural and/or object-oriented programming language, and/or in assembly/machine language. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other implementations are within the scope of the following claims.

What is claimed is:

1. A method of allocating storage volumes across a distributed network of storage elements, the method comprising the steps of:
    defining at least two logical splits on each of the storage elements;
    defining protection groups for the splits of a first of the storage elements using at least two separate protection groups, each of the at least two separate protection groups encompassing a plurality of other protection group members stored on splits of other storage elements of the distributed network of storage elements; and
    distributing the other protection group members of the at least two separate protection groups within the distributed network of storage elements;
    wherein at least some of the other protection group members of a first of the at least two separate protection groups and at least some of the other protection group members of the second of the at least two separate protection groups are not commonly assigned to the same storage element; and
    wherein the protection group members are used to store data from an erasure code.

2. The method of claim 1, wherein the erasure code has a split drive fault span including a combination of a first number of protection group members over which data is dispersed plus a second number of redundancy protection group members.

3. The method of claim 2, wherein no more than the second number of protection group members are contained in any hardware protection zone, wherein the hardware protection zones comprise subsets of storage elements physically separated and supported by independent power supplies and network infrastructure.

4. The method of claim 2, wherein each of the separate protection groups has a size including a predetermined number of protection group members, the method further comprising the step of combining two or more separate protection groups to enable storage of erasure codes having a split drive fault span which exceeds a size of a single protection group.

5. A method of allocating RAID storage volumes across a distributed network of storage elements, the method comprising the steps of:
    defining at least two logical splits on each of the storage elements;
    providing RAID protection for the splits of a first of the storage elements using at least two RAID groups, each of the at least two RAID groups encompassing a plurality of other RAID members stored on splits of other storage elements of the distributed network of storage elements; and
    distributing the other RAID members of the at least two RAID groups within the distributed network of storage elements;
    wherein at least some of the other RAID members of a first of the at least two RAID groups and at least some of the other RAID members of the second of the at least two RAID groups are not commonly assigned to the same storage element; and wherein the step of distributing the RAID protection within the distributed network of storage elements is implemented using a set of heuristics defining placement rules for members of the RAIDs, wherein the heuristics comprise hard rules and soft rules.

6. The method of claim 5, wherein the hard rules include a first hard rule prohibiting placement of two RAID members on a given storage element and a second hard rule requiring placement of RAID members in separate hardware protection zones within the distributed network of storage elements, wherein the hardware protection zones comprise subsets of storage elements physically separated and supported by independent power supplies and network infrastructure, wherein the subsets of storage elements are divided into logical subsets to support logic redundancy.

7. The method of claim 5, wherein the soft rules comprise a first soft rule seeking to minimize overlap between common sets of RAID members on subsets of storage elements.

8. The method of claim 7, wherein the soft rules are applied at a lower priority level to organize RAID groups efficiently to meet the hard rules.

9. The method of claim 7, wherein soft rule parameters are prioritized to maximize soft rule benefits in the final distribution.

10. A non-transitory tangible computer readable storage medium having stored thereon a computer program for implementing a method of allocating RAID storage volumes across a distributed network of storage element, the computer program comprising a set of instructions which, when executed by a computer, cause the computer to perform a method comprising the steps of:

defining at least two logical splits on each of the storage elements;

providing RAID protection for the splits of a first of the storage elements using at least two RAID groups, each of the at least two RAID groups encompassing a plurality of other RAID members stored on splits of other storage elements of the distributed network of storage elements; and distributing the other RAID members of the at least two RAID groups within the distributed network of storage elements;

wherein at least some of the other RAID members of a first of the at least two RAID groups and at least some of the other RAID members of the second of the at least two RAID groups are not commonly assigned to the same storage element; and wherein the step of distributing the RAID protection within the distributed network of storage elements is implemented by defining a matrix based on a set of splits within a first hardware fault zone, and replicating the matrix into other fault zones until all RAIDs have a complete set of members, wherein the matrix is created by forming an matrix template based on a placement of members of the RAID groups such that no two RAID group members from separate RAID groups are stored on more than one storage element in common.

11. The non-transitory tangible computer readable storage medium of claim 10, wherein the matrix is created by reducing the matrix template based on a number of storage elements in the first hardware fault zone of the distributed network of storage elements.

12. The non-transitory tangible computer readable storage medium of claim 10, the method further comprising storing data within the RAID groups.

13. The non-transitory tangible computer readable storage medium of claim 12, the method further comprising recovering data upon failure of a storage element for each split of the failed storage element from the distributed RAID protection within the distributed network of storage elements.

14. The non-transitory tangible computer readable storage medium of claim 13, wherein the step of recovering data is performed in parallel for each of the splits of the failed storage element to accelerate data recovery.

15. The non-transitory tangible computer readable storage medium of claim 10, wherein the step of distributing the RAID protection within the distributed network of storage elements is implemented using a set of hard rules and soft rules defining placement rules for members of the RAIDs, and wherein RAID storage elements of two or more partitions occupying the same physical fault zone are redistributed in the fault zone to further optimize the distributions in accordance to the soft and hard rule requirements.

16. The non-transitory tangible computer readable storage medium of claim 10, wherein the step of distributing the other RAID members of the at least two RAID groups within the distributed network of storage elements comprises performing a simulation to generate at least one RAID group distribution map.

17. A non-transitory tangible computer readable storage medium in claim 16, wherein the RAID group distribution map is determined as yielding a minimum time to reconstruct data of at least one storage element among a set of storage elements, a minimum latency time to read and write data among a set of storage elements, or a most consistent latency time to read and write data among a set of storage elements.

18. A non-transitory tangible computer readable storage medium in claim 16, wherein the RAID group distribution map is determined as yielding a highest data security among a set of storage elements, or a highest data availability among a set of storage elements.

* * * * *